US008725175B2

(12) United States Patent
Altman et al.

(10) Patent No.: US 8,725,175 B2
(45) Date of Patent: *May 13, 2014

(54) NETWORK MANAGER SYSTEM FOR LOCATION-AWARE MOBILE COMMUNICATION DEVICES

(75) Inventors: Samuel H. Altman, Menlo Park, CA (US); Nicholas T. Sivo, Palo Alto, CA (US); Thomas B. Pernikoff, Mountain View, CA (US); Alok Deshpande, Palo Alto, CA (US); Richard M. Pernikoff, Palo Alto, CA (US)

(73) Assignee: Loopt LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,199

(22) Filed: Jul. 8, 2011

(65) Prior Publication Data

US 2012/0172062 A1    Jul. 5, 2012

Related U.S. Application Data

(63) Continuation of application No. 11/932,232, filed on Oct. 31, 2007, now Pat. No. 8,000,726, which is a continuation-in-part of application No. 11/445,730, filed on Jun. 1, 2006.

(51) Int. Cl.
*H04W 24/00* (2009.01)

(52) U.S. Cl.
USPC .................. 455/456.3; 455/456.1; 455/456.6; 455/457; 455/435.1; 455/566; 701/117

(58) Field of Classification Search
USPC ............. 455/456.3, 456.1, 456.6, 457, 435.1, 455/566, 422.1; 701/117
See application file for complete search history.

(56) References Cited

U.S. PATENT DOCUMENTS

| 4,939,662 A | 7/1990 | Nimura et al. |
| 5,086,394 A | 2/1992 | Shapira |

(Continued)

FOREIGN PATENT DOCUMENTS

| EP | 1295500 B1 | 5/2009 |
| WO | WO0160100 A1 | 8/2001 |

OTHER PUBLICATIONS

International Searching Authority, International Search Report and Written Opinion of the International Searching Authority for International Application No. PCT/US2009/049956, Sep. 1, 2011.

(Continued)

*Primary Examiner* — Charles Appiah
*Assistant Examiner* — Khai M Nguyen
(74) *Attorney, Agent, or Firm* — Arent Fox LLP

(57) ABSTRACT

Embodiments of a location sharing network manager process are described. The process is executed on a server computer coupled to a plurality of mobile communication devices over a wireless network. Each mobile device is a location-aware mobile communication device. The process determines the geographic location of a mobile communication device operated by a user within an area, displays a map representation of the area around the mobile communication device on a graphical user interface of the mobile communication device, and superimposes on the map the respective locations of one or more other trusted users of mobile communication devices coupled to the mobile communication device over the network. A comprehensive network manager process provides management functions to allow communication with mobile phone users outside of the service network and allows for efficient communication with groups of users within the service network.

15 Claims, 24 Drawing Sheets

(56) References Cited

U.S. PATENT DOCUMENTS

| | | | |
|---|---|---|---|
| 5,320,409 | A | 6/1994 | Katoh et al. |
| 5,754,939 | A | 5/1998 | Herz et al. |
| 6,014,090 | A | 1/2000 | Rosen et al. |
| 6,049,711 | A | 4/2000 | Ben-Yehezkel et al. |
| 6,052,122 | A | 4/2000 | Sutcliffe et al. |
| 6,061,681 | A | 5/2000 | Collins |
| 6,112,186 | A | 8/2000 | Bergh et al. |
| 6,208,934 | B1 | 3/2001 | Bechtolsheim et al. |
| 6,272,467 | B1 | 8/2001 | Durand et al. |
| 6,317,718 | B1 | 11/2001 | Fano |
| 6,366,568 | B1 | 4/2002 | Bolgiano et al. |
| 6,456,854 | B1 | 9/2002 | Chern et al. |
| 6,529,136 | B2 | 3/2003 | Cao et al. |
| 6,529,143 | B2 | 3/2003 | Mikkola et al. |
| 6,539,232 | B2 | 3/2003 | Hendrey et al. |
| 6,549,768 | B1 | 4/2003 | Fraccaroli |
| 6,618,593 | B1 | 9/2003 | Drutman et al. |
| 6,687,608 | B2 | 2/2004 | Sugimoto et al. |
| 6,819,919 | B1 | 11/2004 | Tanaka |
| 6,965,868 | B1 | 11/2005 | Bednarek |
| 7,047,030 | B2 | 5/2006 | Forsyth |
| 7,071,842 | B1 | 7/2006 | Brady, Jr. |
| 7,082,365 | B2 | 7/2006 | Sheha et al. |
| 7,203,502 | B2 | 4/2007 | Wilson |
| 7,203,674 | B2 | 4/2007 | Cohen |
| 7,236,799 | B2 | 6/2007 | Wilson et al. |
| 7,256,711 | B2 | 8/2007 | Sheha et al. |
| 7,271,742 | B2 | 9/2007 | Sheha et al. |
| 7,333,820 | B2 | 2/2008 | Sheha et al. |
| 7,363,027 | B2 | 4/2008 | Hon |
| 7,486,958 | B2 | 2/2009 | Sheha et al. |
| 7,565,155 | B2 | 7/2009 | Sheha et al. |
| 7,593,740 | B2 * | 9/2009 | Crowley et al. ............ 455/456.3 |
| 7,634,354 | B2 | 12/2009 | Salmre |
| 7,840,224 | B2 | 11/2010 | Vengroff et al. |
| 7,877,082 | B2 | 1/2011 | Eagle |
| 8,000,726 | B2 * | 8/2011 | Altman et al. ............. 455/456.3 |
| 2002/0052786 | A1 | 5/2002 | Kim |
| 2003/0055983 | A1 * | 3/2003 | Callegari ..................... 709/227 |
| 2003/0061211 | A1 | 3/2003 | Shultz |
| 2003/0064705 | A1 | 4/2003 | Desiderio |
| 2003/0149527 | A1 | 8/2003 | Sikila |
| 2005/0032527 | A1 | 2/2005 | Sheha et al. |
| 2005/0054352 | A1 | 3/2005 | Karaizman |
| 2005/0114527 | A1 | 5/2005 | Hankey et al. |
| 2006/0047825 | A1 | 3/2006 | Steenstra et al. |
| 2006/0223518 | A1 * | 10/2006 | Haney .......................... 455/420 |
| 2011/0275388 | A1 * | 11/2011 | Haney ........................ 455/456.3 |

OTHER PUBLICATIONS

Liu, Jennifer, "Bases business competition awards $2,000", The Daily Stanford Online Edition, [Online] Apr. 11, 2005, Retrieved from Internet at <http://stanforddaily.com/cgi-bin/?p=1017453> on Oct. 26, 2009.

Altman, Samuel H., "Viendo: A Mobile Entertainment Management Service", BASES Business Plan Competition/Symposium, Apr. 9, 2005.

Secretadmirer.Com, screen capture using http://web.archive.org of http://secretAdmirer.com website, dated Dec. 2, 1998.

Lat49, screen capture of http://lat49.com/howitworks/index.php, dated Jun. 12, 2009.

Loopt: "About Loopt" Internet Article, [Online] Dec. 14, 2004, Retrieved from Internet at <http://www.loopt.com/about> on Mar. 8, 2009.

Fiercewireless: "Sprint offers Loopt's social mapping service" Internet Article, [Online] Jul. 17, 2007, Retrieved from Internet at <http://fiercewireless.conn/story/sprint-offers-loopts-social-mapp-ping-service/2007-07-17> on Mar. 8, 2009.

Schreiner, Keri, "Where We At? Mobile Phones Bring GPS to the Masses", IEEE Computer Graphics and Applications, vol. 27, No. 3, May 2007-Jun. 2007, pp. 6-11.

Mobilaris, "Find Your Buddy is a Social Networking application", Internet Article, [Online] Jun. 7, 2007, Retrieved from Internet at <http://mobilaris.gotlandica.se/virtupload/content/27/Find_Your_Buddy.pdf. on Mar. 8, 2009.

Mobilaris, "Pacific Ocean extends technology lead by integrating MapInfo miAware? LBS Platform" Internet Article, [Online]. Feb. 6, 2003, Retrieved from Internet at <http://nweb.waymaker.se/bitonline/2003/02/06/200300205BIT00440/wkr0002.pdf> on Mar. 8, 2009.

* cited by examiner

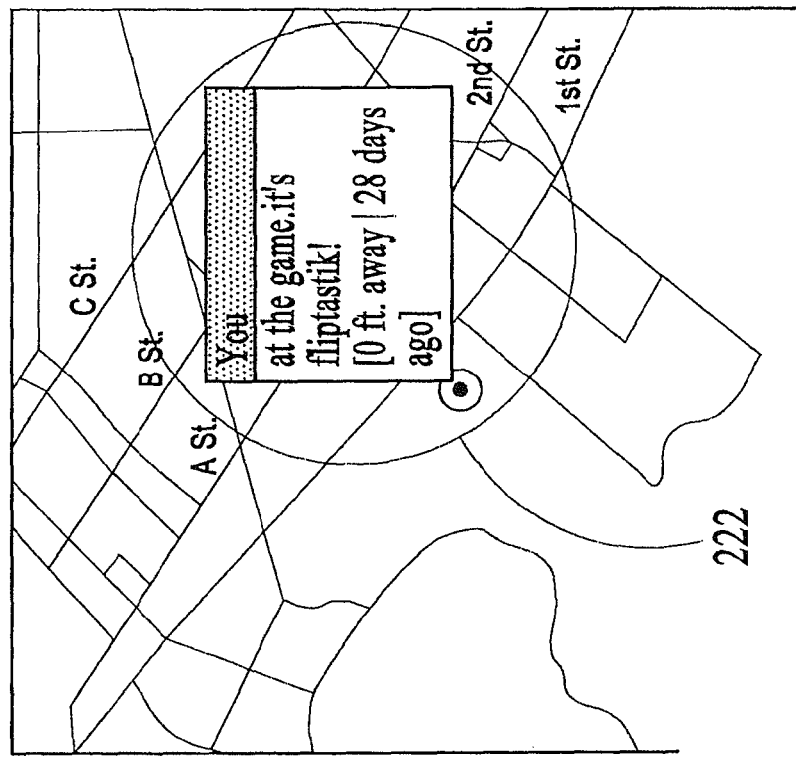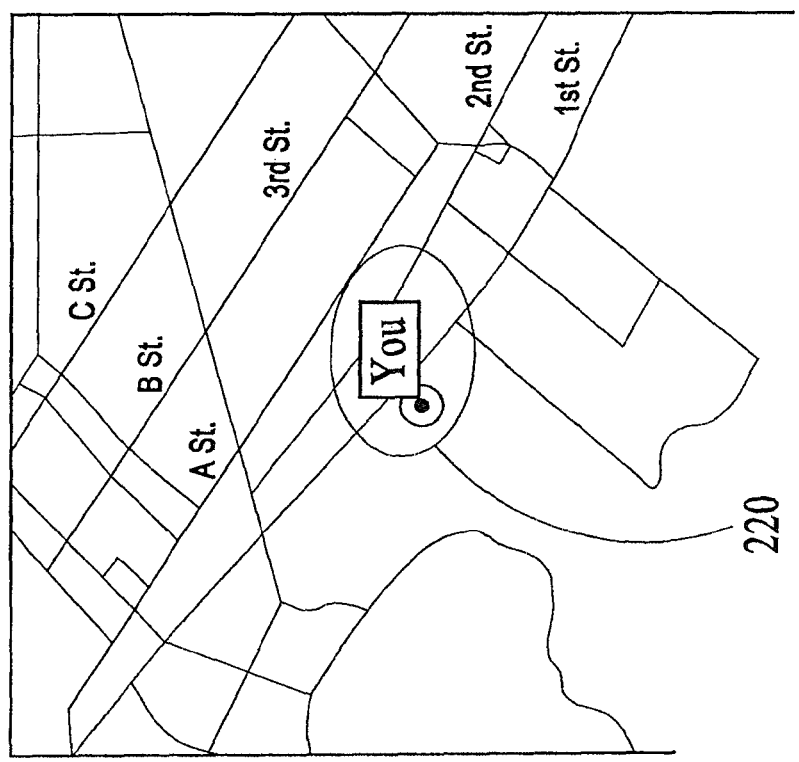
FIG. 2B

Mobile Privacy

Status Message:     606

[                    ]

Choose who can see your location with the settings below.

My location is visible to:     608

○ All friends   ○ Nobody   ⊙ Some Friends (see blacklist below)

Block my location from certain friends by checking them:    610

This list only applies if visibility is set to "Some Friends" above.

[allow all] [block all]

I am currently:     612
○ Free   ⊙ Busy

— 604

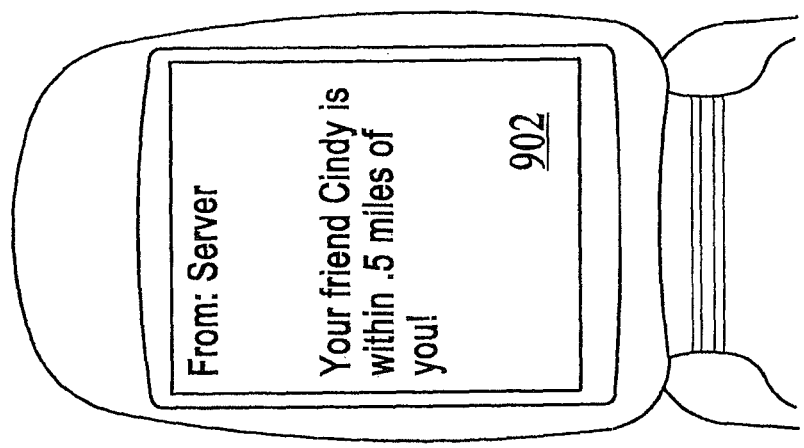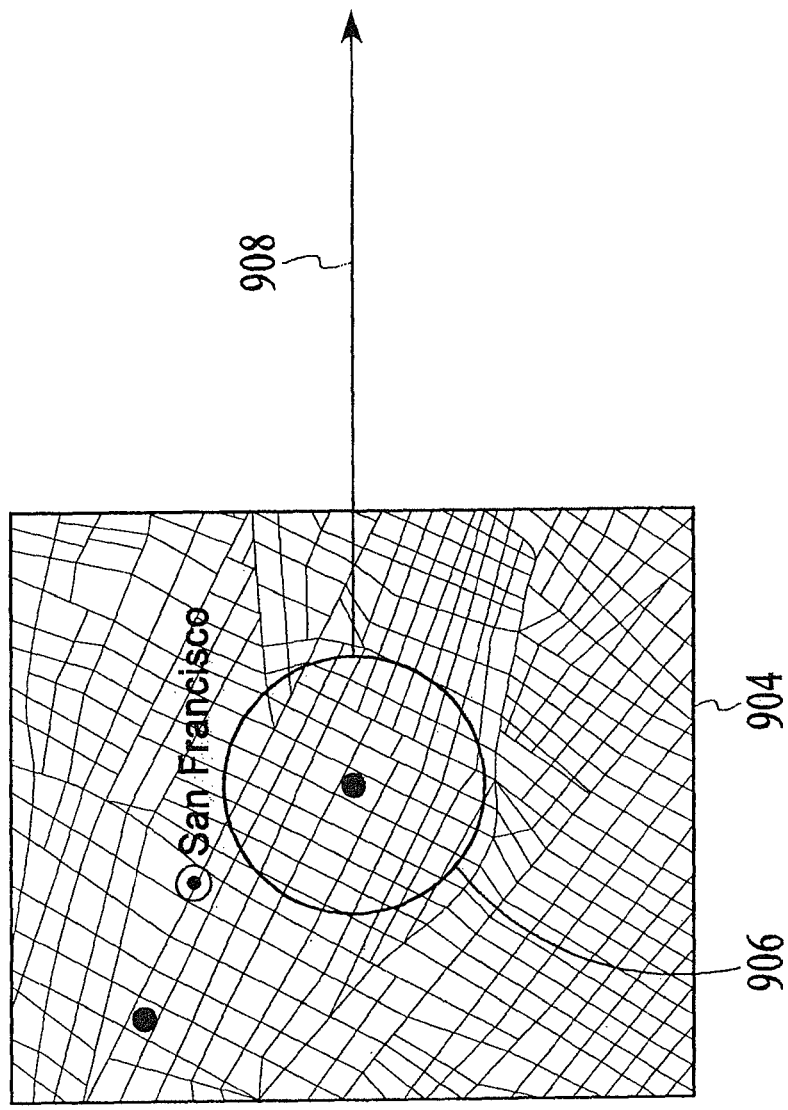
FIG.9

FIG. 13

USER TABLE 1302

| UID | NAME | PHONE | LINKA |
|---|---|---|---|
| 1 | Ilan G. | 555-1452 | A4321d74 |
| 2 | Tei S. | 555-0293 | 41chj892 |
| 3 | Dan H. | 555-2987 | qr99e7b |

LOCATION HISTORY TABLE 1304

| LINKB | LOCATION.HISTORY |
|---|---|
| b56sha12 | 32.5465,14.144 |
| 4a8hop1 | 3243.54,324.3474 |
| c48nfegp | 143554,456477 |

| Notification Type | Clicking notification launches... |
|---|---|
| New friend request | Approve friend request |
| Event reminder | View my events |
| New event invitation | View invitations |
| Friends nearby | Friend map |
| New journal comment | My journal |
| Friend request recently accepted | Friend map |
| New journal entry by a friend | Friends' journal |
| House notifications | Alerts/info on new feature or features that haven't been used |

FIG. 16

NETWORK MANAGER SYSTEM FOR LOCATION-AWARE MOBILE COMMUNICATION DEVICES

CROSS-REFERENCE TO RELATED APPLICATIONS

The current application is a continuation of U.S. patent application Ser. No. 11/932,232, entitled "Network Manager System for Location-Aware Mobile Communication Devices" and filed on Oct. 31, 2007, which is a continuation-in-part application of U.S. patent application Ser. No. 11/445,730, entitled "Displaying the Location of Individuals on an Interactive Map Display on a Mobile Communication Device" and filed on Jun. 1, 2006. The current application is related to U.S. patent application Ser. No. 11/445,727, entitled "Message Transmission System for Users of Location-Aware Mobile Communication Devices in a Local Area Network," and U.S. patent application Ser. No. 11/445,729, entitled "Mobile Dating System Incorporating User Location Information," and U.S. patent application Ser. No. 11/445,751, entitled "Displaying and Tagging Places of Interest on Location-Aware Mobile Communication Devices in a Local Area Network," each of which is hereby incorporated by reference in it entirety.

FIELD

Embodiments of the invention relate generally to mobile communication networks, and more specifically, to a network management system for location-aware mobile device networks.

BACKGROUND

The incorporation of location and navigation technology, such as global positioning system (GPS) technology into mobile phones and similar wireless portable devices has created a class of "location-aware" devices that allow users to communicate with other users as well as determine or even view the location of other users on their own device. Such devices may be configured to display a regional map and the location of other users and/or places of interest on their device. This greatly enhances the social networking capability of such devices, beyond simple voice or text-based communication by allowing users to quickly find friends and associates and coordinate activities based on respective locations.

The advent of social network sites has encouraged the creation and sharing of a great deal of user-generated content. The widespread use of mobile phones, digital cameras and video recorders allows users to record and store a multitude of different events and experiences and share this content with family and friends. Such content is often created and stored in the form of web logs ("blogs") or other similar online diaries or journals that are posted to an online site that is accessible to the public or to specific stets of users. A key feature of such online journals is that they can be accessed and commented on by other users. In general, present methods of generating, storing, and sharing user-generated content are based on the model of a static client computer which is at a fixed location and is used to create and store the journal entries. Mobile devices, such as mobile phones, cameras, tape recorders, video recorders and the like, are typically used only to capture content at a certain location. A user then typically downloads any such content to their personal computer or workstation to create a blog or journal entry. The increased processing, storage, and video/audio capture capabilities of mobile devices along with increased availability of popular application software, however, allows the use of such devices to be used directly in the creation and sharing of journal entries. However, present mobile device platforms do not effectively allow for creation and sharing of user-generated content or the incorporation of location information that is often available in modern telecommunication devices.

The incorporation of location display capability presents unique opportunities in the creation and sharing of user-generated content, such as notes, photographs, audio/video clips, and the like. The use of location information inherent in the location-aware mobile device can be used to create user-content that is relevant to groups of users or members of a network. The location information can also be used to transmit user generated content to specific members of a network, such as members who are in the general proximity of a user or a particular location.

SUMMARY

Embodiments of a location-based social network manager process are described. The process is executed on a server computer coupled to a plurality of mobile communication devices over a wireless network. At least some of the mobile devices are location-aware mobile communication devices. The process determines the geographic location of a mobile communication device operated by a user within an area, displays a map representation of the area around the mobile communication device on a graphical user interface of the mobile communication device, and superimposes on the map the respective locations of one or more other users of mobile communication devices coupled to the mobile communication device over the network. The user can build a database of trusted friends among the one or more other users whose location can be displayed on each respective mobile communication device. A comprehensive network manager process provides management functions to allow communication with mobile phone users outside of the service network and allows for efficient communication with groups of users within the service network.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

Embodiments are illustrated by way of example and not limitation in the figures of the accompanying drawings, in which like references indicate similar elements.

FIG. 2B illustrates the display of information details for users on a map, according to an embodiment.

FIG. 9 illustrates an example of an alert function for the location-based social network manager process, under an embodiment.

FIG. 13 illustrates an example of a user table and an associated location history table, under an embodiment.

FIG. 16 is a table that lists several examples of notification types and the utilities that are launched when the user clicks on the notification.

DETAILED DESCRIPTION

Embodiments of a location-based mobile communication device network system that incorporates a geo-tagged journal creation system are described. In the following description, numerous specific details are introduced to provide a thorough understanding of, and enabling description for, embodiments of the system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1A:
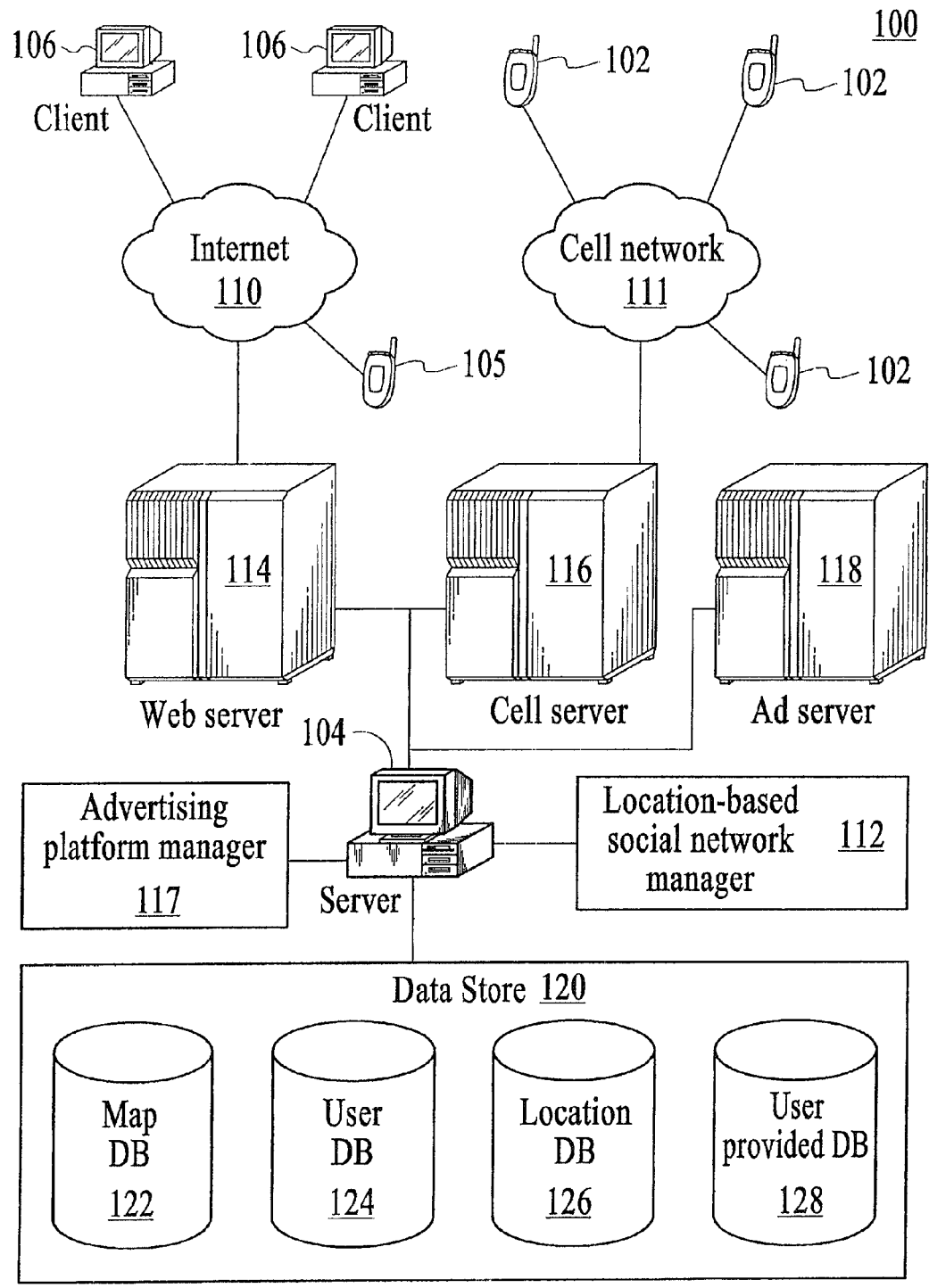
FIG. 1A is a block diagram of a mobile communication and computer network that implements embodiments of a location-based social network system.

Embodiments are directed to a location-based social network system that enables the display of maps and real-time location information on mobile phones and similar communication devices. FIG. 1A illustrates a communication and computer network system 100 that implements one or more embodiments. In system 100, a plurality of mobile communication devices, such as cell phones or similar devices 102 are coupled to a communication network, such as cell network 111. The mobile communication devices (or "mobile devices") are each carried and operated by a user and communicate with one another using known communication methods such as wireless telephony, radio, satellite, cellular systems (e.g., GSM, CDMA, and so on), or other similar systems. For the embodiment exemplified by FIG. 1, the mobile communication devices are cellular phones and the network coupling these devices is a cellular telephone network, although it should be noted that any other type of wireless network that supports mobile devices can also be used.

In one embodiment, a server computer 104 runs a location-based social network manager process 112. This process controls various data objects relating to one or more social parameters or characteristics of the users of the mobile devices 102. The users of the mobile devices form a group or number of subgroups of people who desire to interact with one another on a social level by communicating with one another, participating in activities, sharing information or experiences, or other types of social or professional interaction based on their location. Because the users of the mobile devices are inherently transitory, a fundamental data object associated with each of the users of the mobile devices is the location of each user within a particular region. Other parameters include the profile of each user, and the preferences of each user with respect to activities, people, privileges, and so on. Each user who desires to interact with other users in the system using this data utilizes the location-based social network manager process 112. Through a subscription, or similar membership-type (free or fee-based) participation model, each user registers with the server computer 104 by providing certain information relating to the user. Each principle parameter or characteristic for each user is stored in one or more databases accessible to the server computer 104. For the embodiment of FIG. 1, the data objects are stored in a data store 120 and are organized in databases for user profiles 124, user locations 126, user provided data 128, and map tiles 122. The mobile network 111 supporting the mobile devices 102 are coupled to the server computer through an intermediate server computer, such as cell server 116.

In one embodiment, each user of a mobile device may also operate or access the location-based social network manager process 112 through a client computer 106, or any device that can access the Internet, such as a WAP (Wireless Application Protocol) device 105. The client computer 106, or similar device 105 (hereinafter also referred to as a "client computer"), facilitates the establishment and management of each user's account on the server computer by providing a comprehensive interface to the databases and processes provided on the server computer 104. For the embodiment shown, the client computer interface supported by the server computer is a World-Wide Web (WWW) based interface through a web server 114 to the network 110 that supports the client computers 106. Thus, for this embodiment, the web server 114 is a server or process that stores data in the form of web pages and transmits these pages as Hypertext Markup Language (HTML) files over the Internet 110 to the client computers 106. For this embodiment, the client computers typically run a web browser program to access the web pages served by the web server 114 and any available content provider or supplemental server that may also be coupled to the network. The client computers may access the Internet 110 through an Internet Service Provider (ISP). It should be noted that network 110 may be the Internet, a Wide Area Network (WAN), a Local Area Network (LAN), or any combination thereof.

As shown in FIG. 1A, aspects of the one or more embodiments described herein may be implemented on one or more computing devices executing software instructions. The server computer 104 is typically a server or workstation class computer, but can be any type of computing device with sufficient power and resources. The client computer 106 or 105 can be any type of personal computing devices, such as a workstation, personal computer, notebook computer, mobile communication device, game console, camera, personal digital assistant (PDA), or any device with an appropriate amount of processing capability. Likewise, each mobile device 102 can be a mobile computing device, such as a mobile phone, PDA, notebook computer, game console, or any similar class of mobile computing device with sufficient processing and communication capability to interact with other devices over network 111.

As shown in FIG. 1A, server computer 104 runs a server-side location-based social network manager process 112. The client computers 106 may run a client side version of this program, or they may access executable program components over the network 110, such as through web browser. Data for any of the clients 106 or mobile devices 102 may be provided by a data store 120 that is closely or loosely coupled to any of the server 104 and/or each network 110 and 111. A separate content provider computer may provide some of the data that is associated with the social network manager program 112. Although data store 120 is shown coupled to the network server 104, it should be noted that content data may be stored in or more data stores coupled to any of the computers of the network, such as a network client 106 or to devices within the network 110 itself.

In one embodiment, the location-based social network manager process 112 contains one or more program components that perform the tasks of displaying location and user profile information related to each mobile communication device that is part of the network, on each mobile device and client computer, and facilitating communication between devices based on the location information. The process also includes a database manager program that manages the different databases stored in data store 120. It should be noted that the various databases 122 to 128 shown in data store 120 can be organized as separate databases, portions of a single database, or any other logical structure appropriate for storing the data.

As illustrated in FIG. 1A, data store 120 stores user information in user database 124. This information relates to each user of a mobile device 102 and includes basic information, such as the user's name, identifier (nickname or "uid"), security check information (e.g., date of birth, password), and so on. Depending on the social network services provided by the system, this database can also store the user's social and consumer preference information, such as what type of people the user is interested in meeting or dating, what types of food or events the user prefers, and so on. The user provided database 128 stores graphic information related to each user, such as the user's picture, and any other associated images. These images can be displayed on the other user's mobile devices to provide a visual reference for each user. The user provided database can also store other data objects, such as video clips, audio clips, hypertext links, documents, or other data provided by or associated with the user. The user provided database also stores user-generated content that can be included in journals or blogs maintained by the user. The journals comprise journal entries that are stored in chronological order and that can be accessed and commented on by other users of the system.

Real-time location information for each user, and geotagged places and journal entries, and so on, is stored in the location database 126. A map database 122 can also be included. This database provides the background maps that are displayed on each user's mobile device and correspond to an area or region around the user at the time the user invokes the process. In one embodiment, the map images comprise map tiles that are image files of maps with varying degrees of granularity. For example, a map tile of the United States may provide an image of the continental U.S. that can be zoomed to display a regional street level map for any area in the U.S. The maps may be stored locally within the data store 120 to be provided by the server 104 to the appropriate mobile device 102, or they may be provided by a third party map provider. Other databases storing information relating to the user's of the system and the areas of their operation can also be included in data store 120, such as an events database, a place of interest database, a store finder database, and the like.

Figure 1B:
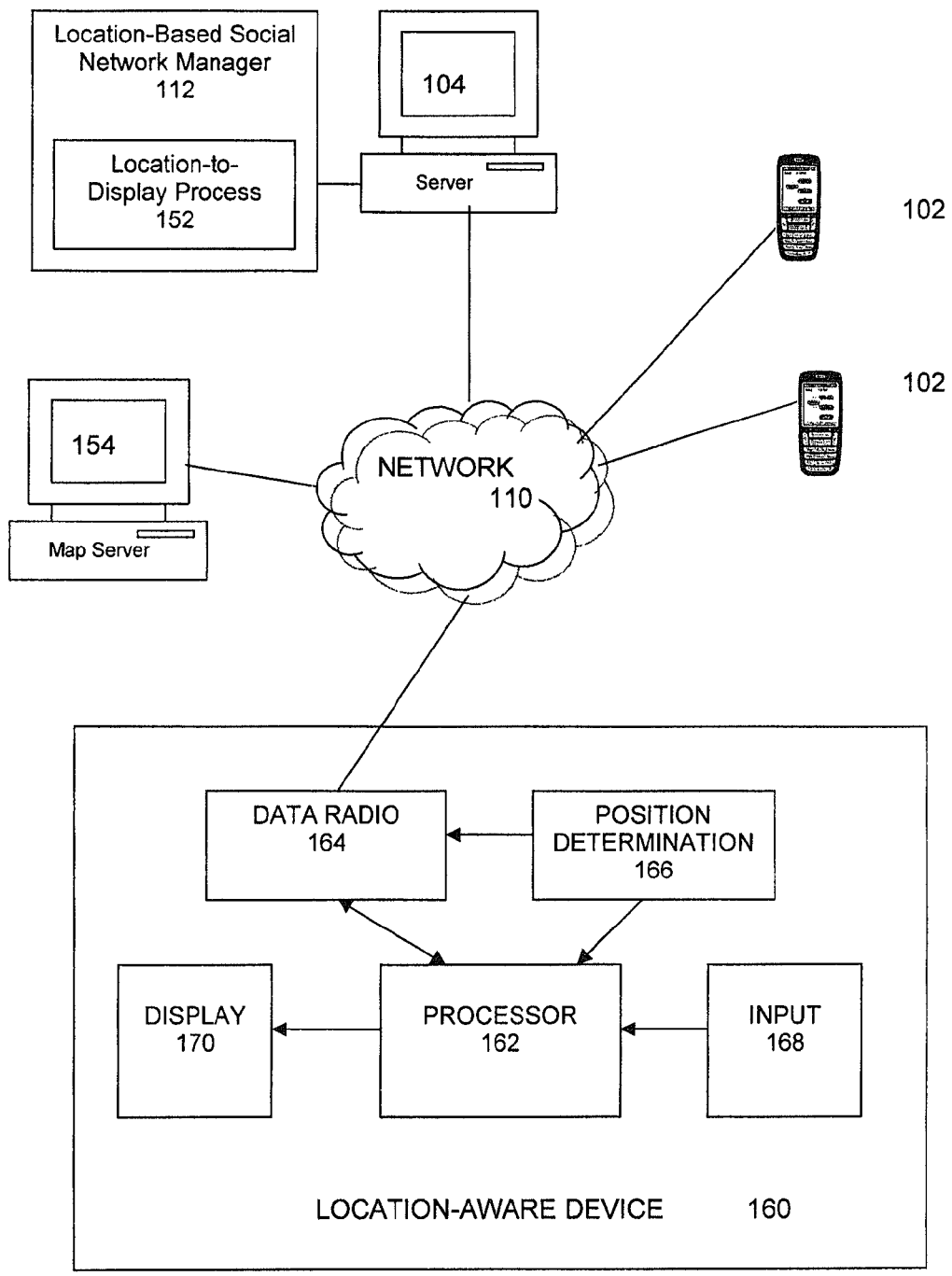
FIG. 1B is a block diagram of components of a location-aware mobile device that is used in the network of FIG. 1A, under an embodiment.

FIG. 1B is a block diagram of components of a location-aware mobile device that is used in the network of FIG. 1A, under an embodiment. For the embodiment of FIG. 1B, location-aware device 160 represents a mobile phone or similar mobile device that incorporates the location sharing feature provided by the location-based social network manager process 112. This allows the location of device 160 to be displayed on its own display 170 as well as on the display of other user devices 102, which may or may not have location capabilities, and/or server computers 104. Location information for the device is determined by position determination unit 166, such as a Global Positioning System (GPS) method, or other location determination process implemented within the device 160. The location information is provided in a standardized format, such as latitude/longitude to a processor 162 and a data radio 164. Because of the limited size of the displays on devices 160 and 102, the background map must be appropriately scaled depending on user preference. In one embodiment, the scale information is provided by the user through input 168 (e.g., keypad input). The data radio 164 transmits the location data for the device as well as the scale information over network 110 to server 104.

In one embodiment, the location-based social network manager process 112 executed by server 104 includes a location-to-display process 152. This process converts the location data into pixel data that displays an icon representing the device 160 on a map that is appropriately scaled based on user input. The background maps may be provided by a separate map server 154. The location-based social network manager process 112 includes components that display the location information for device 160 to other user devices 102 based on lists of friends whom user 160 has specified as authorized to view such location information.

In an alternative embodiment, the location-to-display process may be implemented in part or in whole by a process that is executed locally on device 160.

Figure 1C:
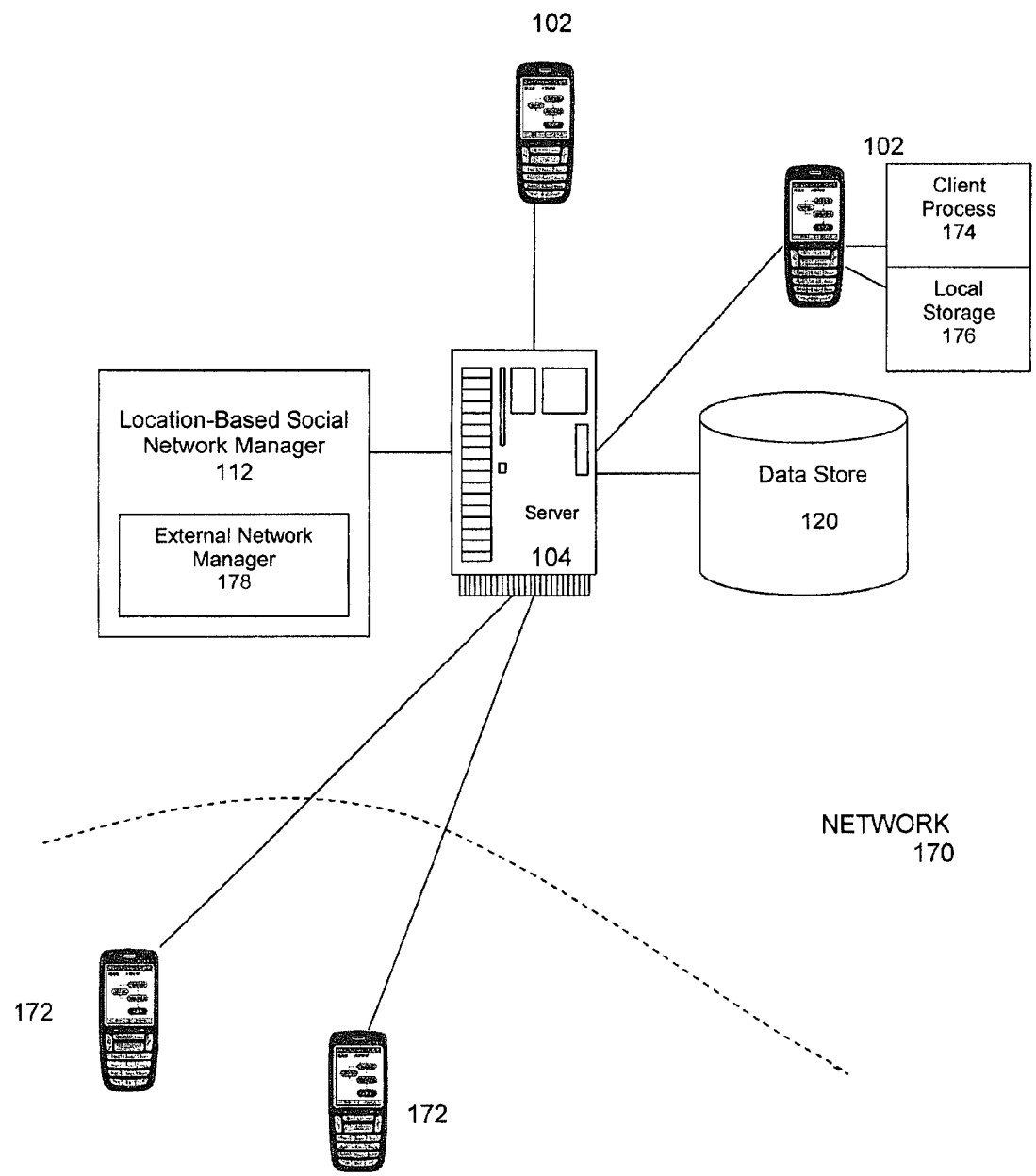
FIG. 1C illustrates a network system comprising users within a defined service network and users outside of the defined service network.

In general, each of the client 102 users in FIGS. 1A and 1B subscribe to a service provided by the location-based social network manager that operates server 112. This allows them to utilize the location-sharing capabilities of the service. In one embodiment, the location-based manager process 112 includes modules that allow a user of the service to communicate location information with users outside of the service. FIG. 1C illustrates a network system comprising users within a defined service network and users outside of the defined service network. As shown in FIG. 1C, network 170 represents a network of users 102 that subscribe to the service provided by location-based social network manager 112 that is served by server 104. Within network 170, the location-based manager process 112 controls certain information relating to the client devices 102. Client devices 102 send location information to the server 102 for display on other client devices within the network 170. Certain relevant information such as user profile information, subscription information, location, friend networks, alert settings, journal entries, and other relevant information is stored in data store 120 that is coupled to server 104. Each client device 102 may execute client-side processes that provide certain services that are native to the device or that are provided by third party providers such as ISP's or cellular service providers. These can include messaging services and the like. Certain data regarding these resident services and user settings may be stored in a local storage 176 within the client device 102. The local storage 176 may store data objects such as contact lists, phone books, user preferences, and the like.

In one embodiment, the location-based social network manager process 112 includes an external network manager process 178 that allows certain limited communication of location-based information to client devices 172 that are outside of network 170, and hence are not users of the service provided by the location-based social network manager. The external network manager process 178 allows for the transmission of a user's location to anyone in the locally stored address book or buddy list as a text message to the external client device 172.

Social Networking

In one embodiment, each user of a mobile device 102 maintains an account on the server computer 104 that is set up and maintained through a subscription or similar membership mechanism. This account allows each user to define their own profile and preference data and define the boundaries of interaction with the other users in the system. The server computer 104 may be a centralized server or cluster of server computers that maintains the processes and databases for a number of different users, or it may represent a distributed set of computers located in different geographic regions, each serving a different group of users.

The location-based social network manager allows each user to set up virtual networks that connect that user to other people, places, and events in a manner that adaptively utilizes the geographic location information for each or any of these items. The process 112 utilizes the user profile and preference information to allow the user to define networks of friends within the entire group of users and then locate these friends on maps that are displayed on the mobile device itself. Using the messaging and/or calendar functions of the mobile device, the user can then send and receive messages on the device from these friends, or find places of interest or events in the area.

In one embodiment, each mobile communication device runs local client versions of the map generator and database manager components. Such a component or components may be a thin-client program, such as a Java program running on a cell phone, for example. In one embodiment, each mobile communication device includes a circuit or component that determines the geographic location of the device relative to a standard set of coordinates. Such a location determination component can be a GPS module or assisted GPS (A-GPS) that provides the location of the mobile communication devices in terms of latitude/longitude coordinates, or a locator module that provides the location in terms of distance to the nearest fixed cell transmitter location or a group of transmitters, or other similar location determination method. Such methods can include, but are not limited to: Time-of-Arrival (TOA), Time-Difference-of-Arrival (TDOA), a Wireless Fidelity (WiFi) network, mesh networks, and similar networks. The client side map generator displays a map of an area (provided by map database 122) around the user on the display screen of the mobile communication device. Superimposed on this map is an indicator for the location of the mobile communication device. As the user moves, the position of his location on the displayed map is updated in real-time or near real-time. The map image information is configurable depending upon the location of the user, and can be provided by the server computer 104, a separate map provider service, or it can be programmed into the mobile device itself.

In one embodiment, the client-side database manager component stores user-generated connections between the subscribing user and other subscribing users (e.g., acquaintances, friends, family, or other contacts) (hereinafter collectively referred to as "friends"), as well as other items of interest, such as places of interest or locations of events of interest as generated by the subscribing users. The map generator component can be configured to display the locations of such subscriber-generated places or of any friends that are within the region displayed on the map, and have mobile devices that are similarly capable of determining their own location. In this manner, the user of the mobile communication device can see his or her location relative to other friends or places of interest directly on maps displayed on the mobile communication device. In general, the displayed map is a street level map to aid the navigation of the user within the region displayed by the map. The map can be scaled from any number of degrees of resolution, such as from country to state or city level down to block level, depending upon the configuration of the map generator component.

Figure 2A:
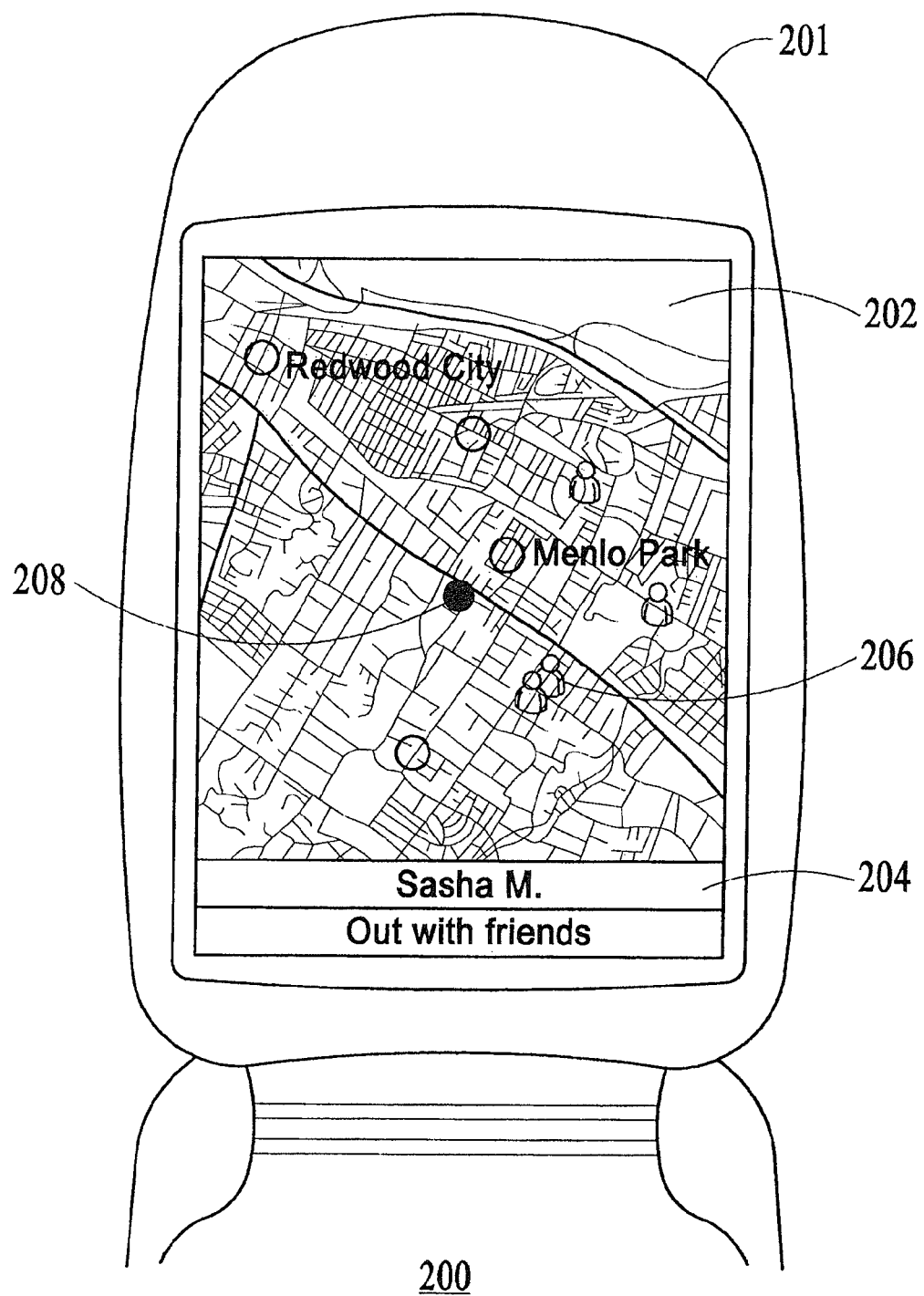
FIG. 2A illustrates an example of a map displayed on a mobile communication device, according to an embodiment.

FIG. 2A illustrates an example of a map displayed on a mobile communication device, according to an embodiment. As shown in FIG. 2A, a mobile communication device, such as cellular phone 200 has a display screen 202. The map generator displays a map on the display with certain icons superimposed thereon denoting the location of certain friends or places of interest to the user. For example, a large circular icon 208 may denote the location of the user of the mobile device, while smaller icons 206 or icons of a different shape and/or color may indicate the location of his or her friends. The display area can be divided into a number of different sub-display areas devoted to displaying information relating to the items displayed. Thus, as shown in FIG. 2A, display area 204 displays certain information relating to the user, such as name, and status information. The status information includes both a status message, a user-programmed message that is displayed on the mobile devices of the other users, and an indication of availability of the user, such as "free" or "busy." A status flag can be defined to allow the user to specify whether he or she is busy or free to all or certain users.

Depending upon the constraints of the display of the mobile device, other items of interest, such as names and status of friends and/or places of interest or events can also be displayed or shown on the map. Different visual indicators or tiling techniques, or nested menu techniques can be used to provide access to the graphical information provided on the display. In one embodiment, the process can be configured to display the name, image, and any associated status information for a user when the icon associated with the user is selected on the display.

FIG. 2B illustrates the display of information details for users on a map, according to an embodiment. Because of display space limitations that may be inherent in the mobile communication devices, and even the web pages, various different display configurations can be used to maximize the amount of information displayed at any one time. In one embodiment, pop-up screens are utilized to display the user information for a user whose location is displayed on a map. As shown in FIG. 2B, the default display for a user 220 shows the name or user ID for each displayed user. In this example, the displayed icon is for the user of the mobile communication device himself, and so the user icon is labeled "You." Instead of displaying the user information is a portion of the display screen, the user information is provided in a pop-screen that is activated by a toggle switch or command. Thus, as shown in pop-up display 222, information relating to the displayed user, such as an image, a profile, or a pre-stored message can be displayed without occupying too much display space. This window can be minimized using the appropriate reverse toggle sequence. In this manner, the amount of displayed information can be selected directly by the user.

Figure 2C:
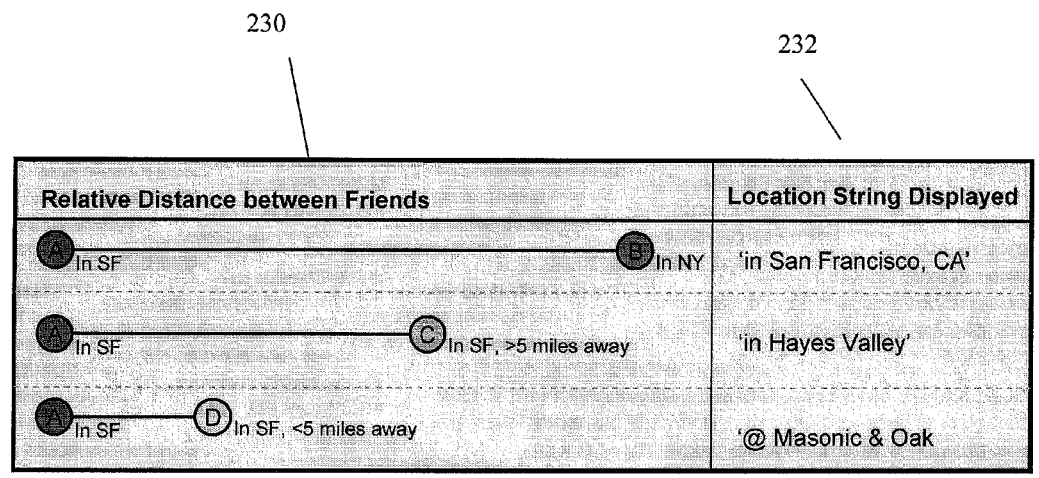
FIG. 2C illustrates an example of a location string that is displayed based on the relative distance between friends for the scaling process, under an embodiment.

As shown in FIG. 2A, the dimension and size of the displayed map generally scale depending on the distance of the friends from the user, as well as display constraints of the client device 201. In one embodiment, the map size automatically scales to the lowest level of granularity that displays all of the enabled friends. FIG. 2C illustrates the correlation of the relative distance, and the location that may be indicated by the system, under an embodiment.

Figure 2D:
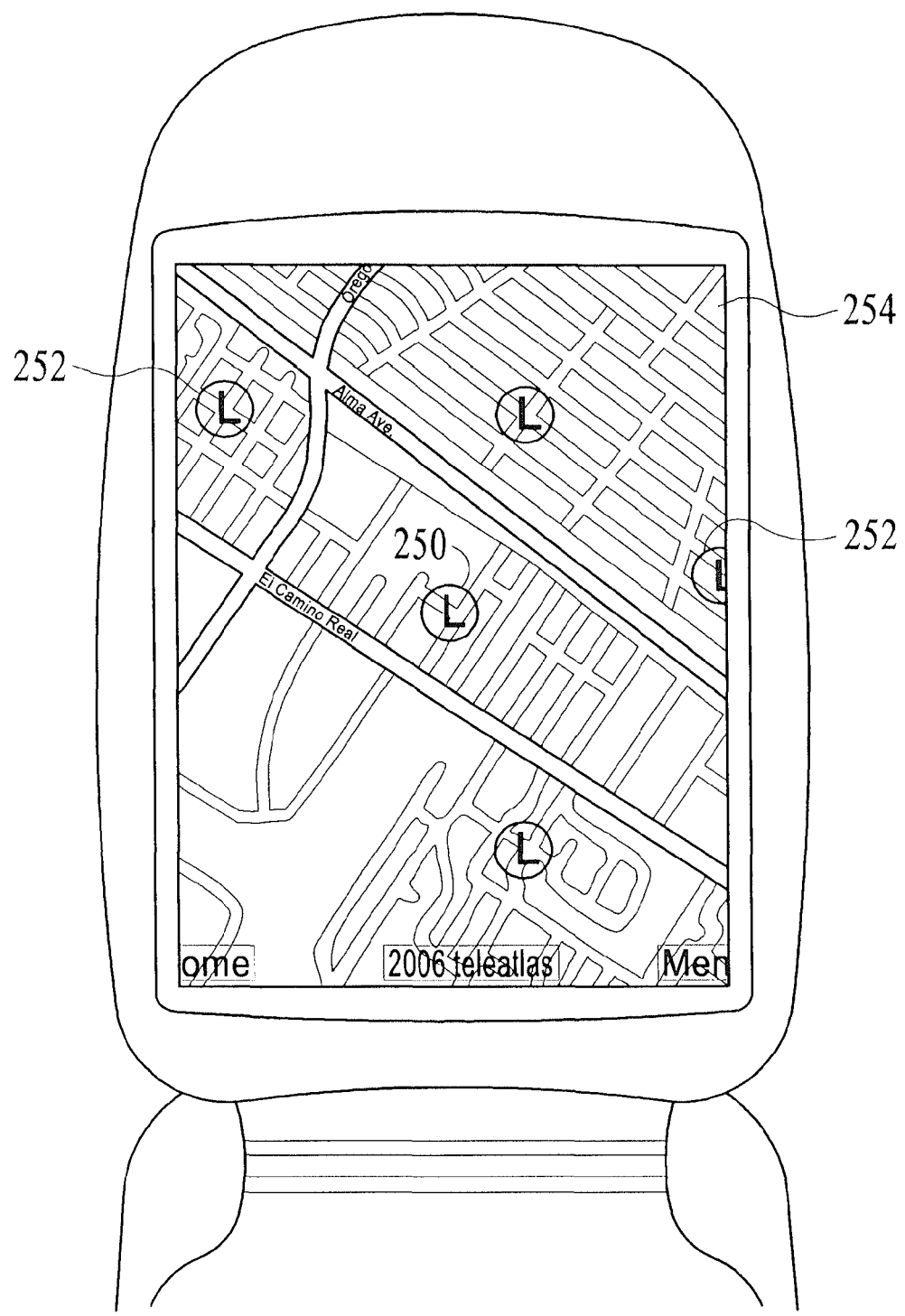
FIG. 2D illustrates the display of places of interest on a displayed map, under an embodiment.

As shown in FIG. 2A, the location of a number of friends of a user can be shown on a map that is displayed on the user's client device. Besides user locations, points of interest or places of interest (POI) can also be displayed on the map. Such places of interest can be defined by the user or user's friends, or they can be publicly known places of interest that are provided by a third party. FIG. 2D illustrates the display of places of interest on a displayed map, under an embodiment. As shown in FIG. 2D, the location of the user is illustrated as icon 250 and a number of POIs 252 that are in the vicinity of the user are displayed as surrounding icons on map display 254. Such places of interest can be businesses, friend's houses, or any other defined and static point of interest.

Figure 3:
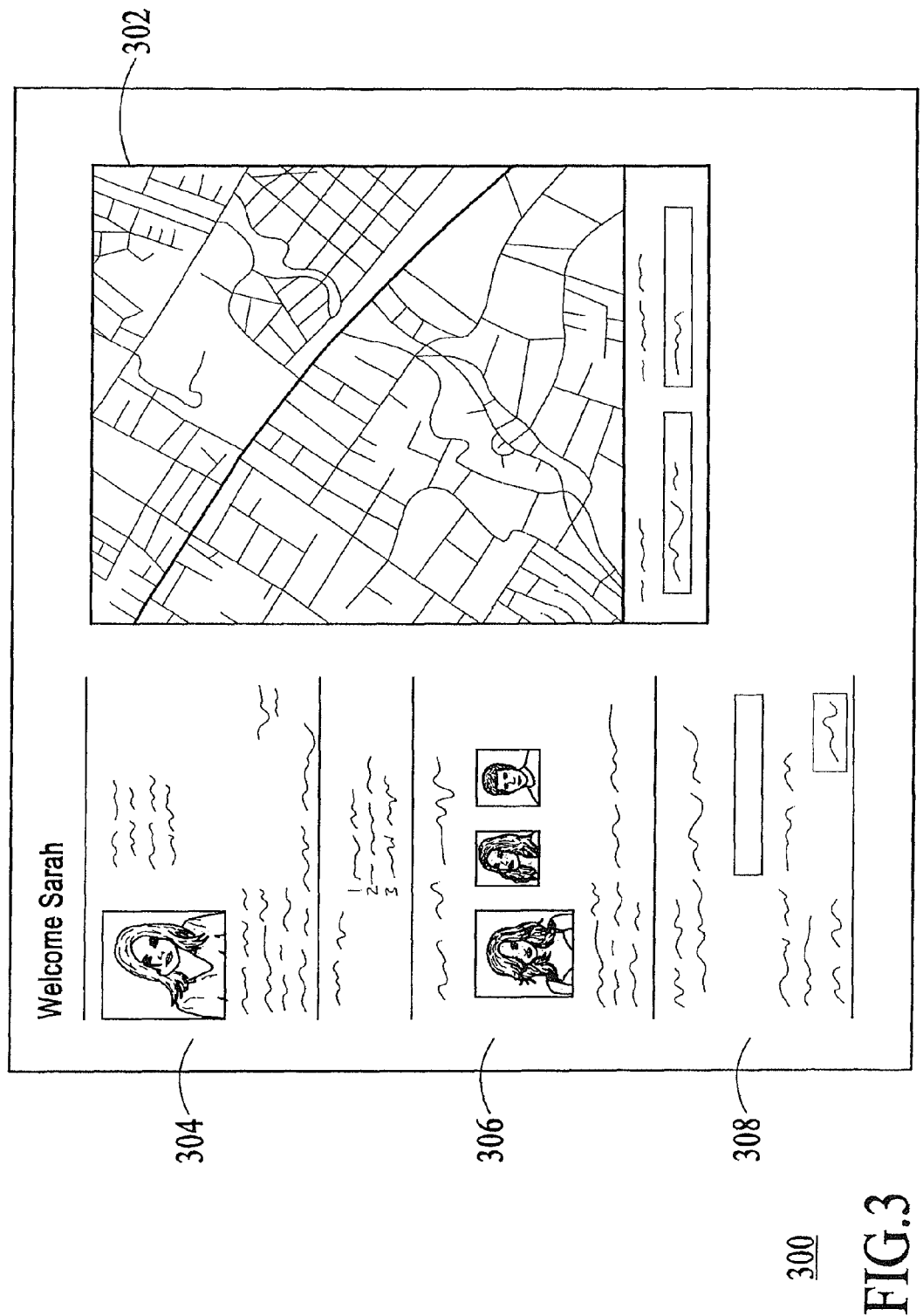
FIG. 3 illustrates a web page that provides access to the databases and social network manager system, under an embodiment.

In one embodiment, access to the account for a mobile device user is also provided through a web-based (or similar) interface from a client computer 106. In general, client accounts and databases are created using the server computer. The client computer provides the means for the user to manage the databases used by the map generator, user database, user provided database, etc. and takes advantage of greater processing power typically not found in mobile devices, such as cell phones. One or more databases are created to store information related to the user's friends and other items of interest, such as events, locations, and the like. In one embodiment, the client computer 106 runs a web browser 114 to access web pages and resources available on server 104 and served by web server 114. FIG. 3 illustrates a web page that provides access to the databases and social network manager system, under an embodiment. For the example web page illustrated in FIG. 3, a first display region displays a map 302 showing the location of the user's mobile device. The user's profile is displayed in display area 304. Other display areas can be configured to display other items of information depending upon the requirements of the user. For example, display area 306 can display messages or requests from friends, and display area 308 can provide an input area to send messages or requests to friends. The information shown on the web page 300 can be the same information displayed on the mobile device in a scaled up and rearranged format to take advantage of greater display space, or it may display information that is impractical to show and manage on the mobile device.

Figure 4A:
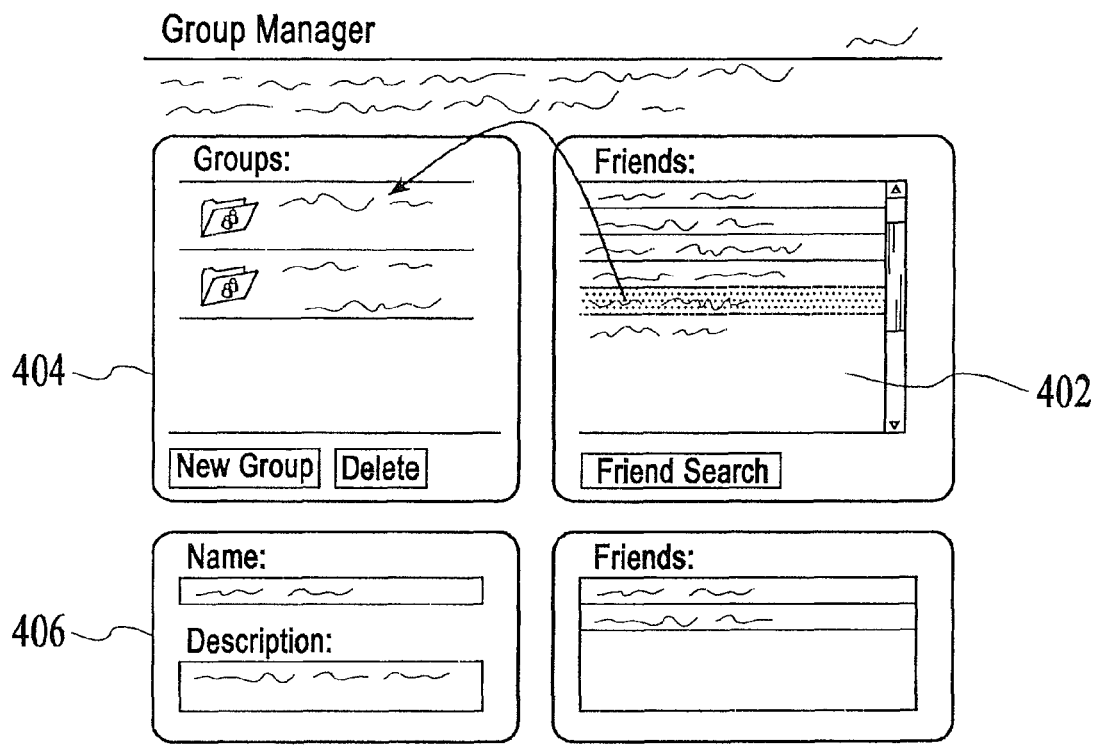
FIG. 4A illustrates an example of a database interface for storing and grouping friends on a client computer, under an embodiment.
Figure 4B:
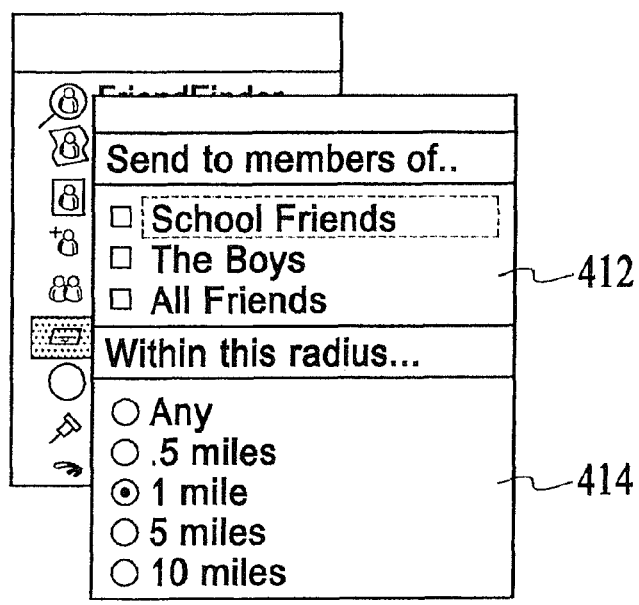
FIG. 4B illustrates an example of a database interface for storing and grouping friends for implementation on a mobile communication device, under an embodiment.

The database manager allows a user to create a database of friendship connections, events, places of interest, favorite things, and any other items that have geographic and/or time context with respect to interests of the user. These data objects are stored in the user database 124 for each user. The information in this database can be organized in any number of ways. For friends, a grouping function allows the user to define specific sub-groups of friends to facilitate finding or messaging select people out of the total number of friends. Thus, friends can be grouped into different categories to allow easier identification and contact with specific people. The client side module on the mobile device allows the user to access and modify these databases of friends, events, and so on, on the mobile device. FIG. 4A illustrates an example of a database interface for storing and grouping friends on a web page, and FIG. 4B illustrates an example of a database interface for accessing the friends database on the mobile communication device. In one embodiment, the mobile communication device interface can also allow the user to manage the database by allowing storage and grouping of friends through a function similar to that illustrated in FIG. 4A. As shown in FIG. 4A, a list of contact names from the user database 124 is displayed in display area 402 and a set of groups is displayed in display area 404. Through a drag and drop operation, or similar method, names can be added to one or more appropriate groups. Display area 406 allows a user to define or modify an existing group by naming, describing and modifying the composition of the group. A similar database access and grouping function is provided through the client side program for execution on the mobile communication device. The client side module allows the user to access the group database on the client computer, and add or modify the group definitions. As shown in FIG. 4B, the defined groups are shown in display area 412. In addition, a geographic descriptor is also provided to further define a characteristic associated with the group or any member within a group. For the embodiment illustrated in FIG. 4B, display area 414 includes a descriptor that specifies the radius of the friends group relative to the user's mobile communication device. In this manner, a message or alert can be sent not only to friends in a particular group, but friends who are within a certain proximity to the user. This additional degree of communication filtering takes advantage of the geographic location information determined by the network 100. This location element related to the database of friends and friend-groups can also be employed by the client computer 106 when it accesses the database on server 104.

Figure 5A:
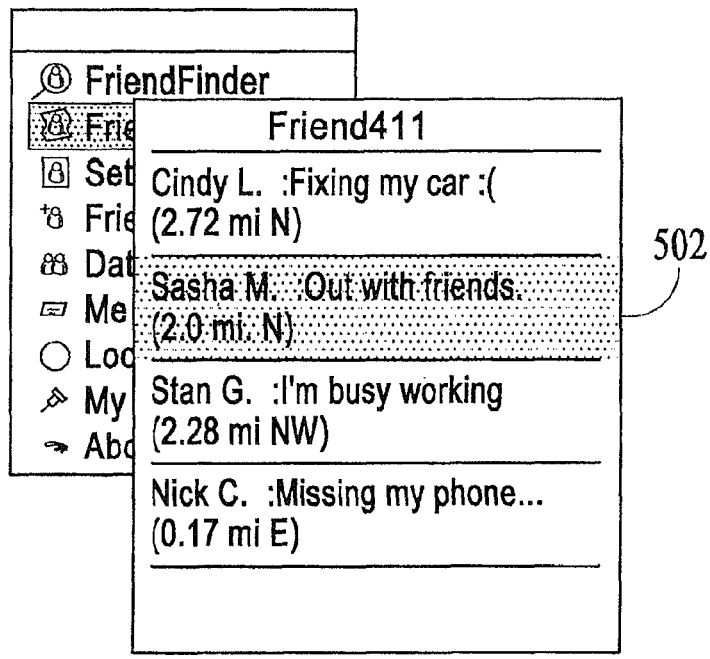
FIG. 5A illustrates an example of a friend list displayed on a mobile communication device, according to an embodiment.
Figure 5B:
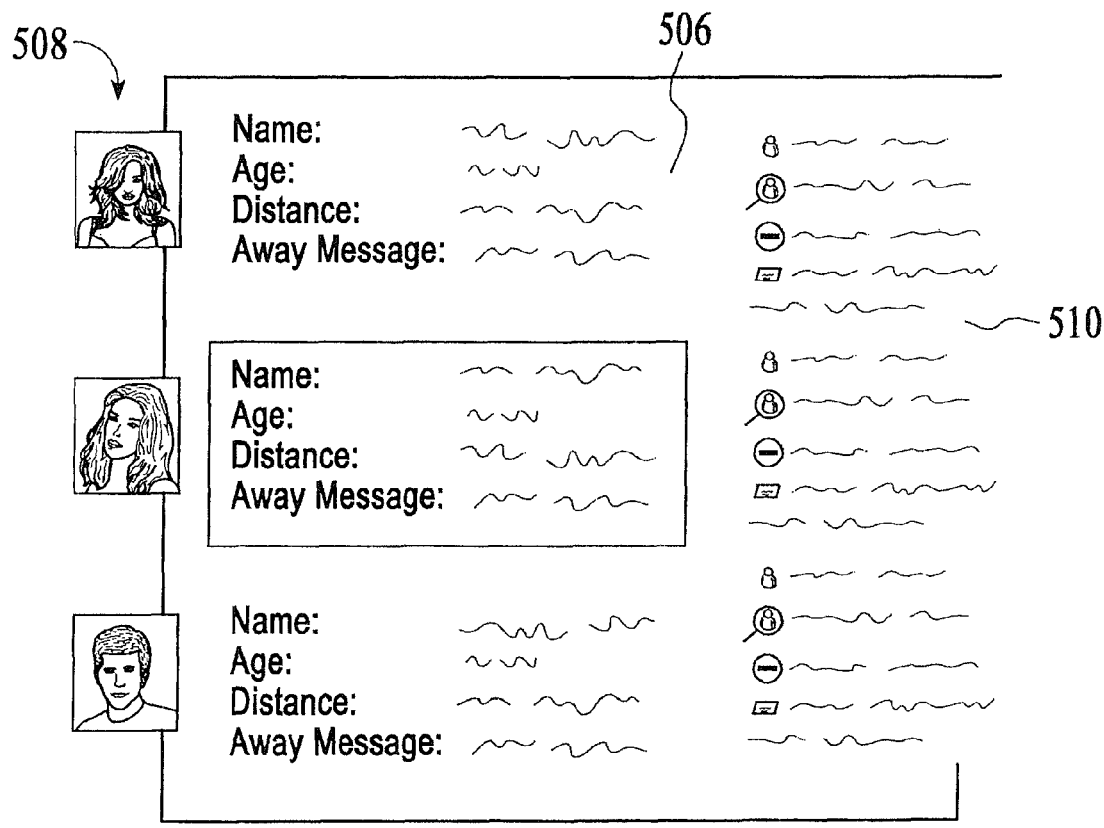
FIG. 5B illustrates an example of a friend list displayed on a web page, according to an embodiment.

Information within the databases stored in data store 120 can be combined in any number of ways to provide the user with appropriate data relating to his or her friends. The location information relating to each friend can be used to provide a visual reference for the user on a map of the area, such as that illustrated in FIG. 2A. In one embodiment, the location-based social network manager process includes a list utility that allows the user to pull and display various items of information relating to each of the friends within the system. Not only can location information be displayed on a map, but specific information can be displayed in a list format on the client computer or mobile device of the user. FIG. 5A illustrates an example of a friend list displayed on a mobile communication device, and FIG. 5B illustrates an example of a friend list displayed on a client computer, according to embodiments. As shown in FIG. 5A, the friend list function starts a display window 502 on the display of the mobile device that lists friends whose information is accessible to the user. For each listed friend, various items of associated information can be displayed, such as the name, location (address, distance plus direction vector, latitude/longitude, time of last update or other), and any associated message or status information. The status information is programmed into the profile portion of the user database 124 for each friend and is pulled from that database, while the location information is pulled from the location database 126 for each friend and is pulled from that database. If the display of the mobile device accommodates the inclusion of the user's image, the image may be pulled from the images within the user provided database 128 and also displayed on the mobile device. This is illustrated in the interface for the client computer shown in FIG. 5B. In this embodiment, the same location and status information 506 is displayed for each friend along with an image 508 of that person. Also provided in the illustrated client computer interface is a menu area 510 that allows the user to perform certain tasks associated with the friends list, such as finding or removing friends, or sending messages to other users.

Figure 5C:
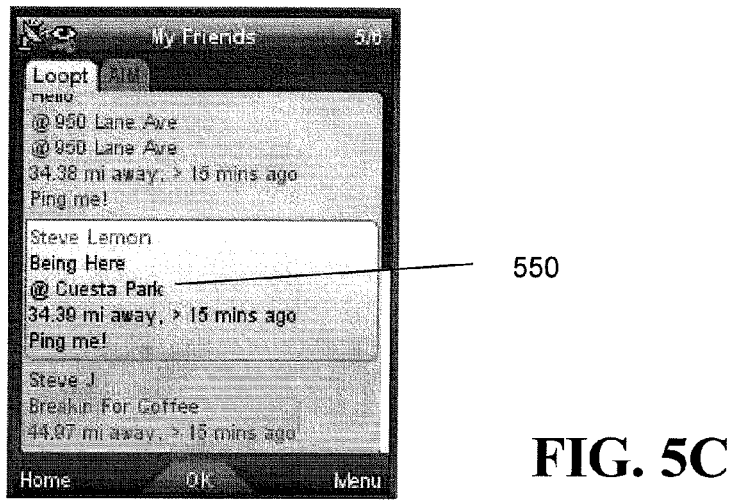
FIG. 5C illustrates a friend list that provides information on the location of a friend, under an embodiment.

For the embodiment of FIG. 5A, the friend list displays a friend's status message and the distance of the friend from the user. In an alternative embodiment, the friend list can be configured to a location string that provides further detail on the location of the friend. FIG. 5C illustrates a friend list that provides information on the location of a friend, under an embodiment. As shown in FIG. 5C, a text description 550 of the friend's location is illustrated following an "@" symbol. A location string can be preceded by a number of different prepositions depending on the accuracy and granularity of the user's location string, (@, in, near, around, etc.). The text description could be provided by user entry or pulled from a POI database that correlates place description to lat/long location data, or from a reverse geo-coding process. The location string or text description can be of any appropriate format and might be a street intersection (e.g., '5$^{th}$ & Main'), neighborhood (e.g., 'Upper East Side'), city/county (e.g., San Francisco, Calif.) or a nearby POI (e.g., 'Joe's bar').

As shown in FIG. 5C, the friend list that displays relevant information about friends (status message, location string, etc.) also includes information about how far the friend is from the user (e.g., "34.49 mi away"). The system can be configured to automatically display varying levels of location granularity in the location string depending upon this distance. For example, if a user is in San Francisco and their friend is in New York, the system will display 'in San Francisco, Calif.' as the relevant location string. However, if both the user and the user's friend are in the same city, system may display the user's street intersection ('near Masonic & Oak') or neighborhood ('Hayes Valley') depending on their relative distance. FIG. 2C illustrates an example of a location string 232 that is displayed based on the relative distance between friends 230 for the scaling process, under an embodiment.

In certain cases, the degree of detail provided the automatic scaling process may not be desirable. In this case, the location-based manager process 112 can be configured to allow users to choose the level of location granularity they want to share. When a user sets their status message, they are able to choose the type of location string to share: street intersection, neighborhood, city/county or POI. In one embodiment, after a user moves away from that particular location, the service updates the location string automatically by reverse geo-coding that user's latitude and longitude. In certain cases, this automatic update to an exact latitude and longitude can be translated to a scale that corresponds to the user-selected granularity level.

Figure 5D:
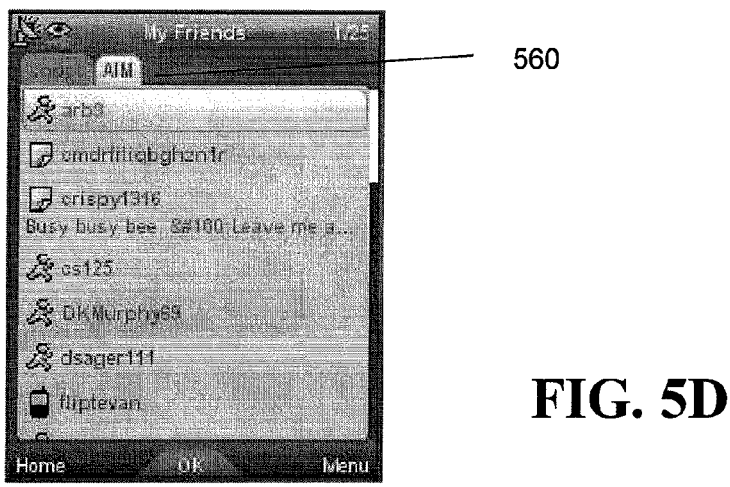
FIG. 5D illustrates the integration of a local service friends list with the location-based manager process, under an embodiment.
Figure 5E:
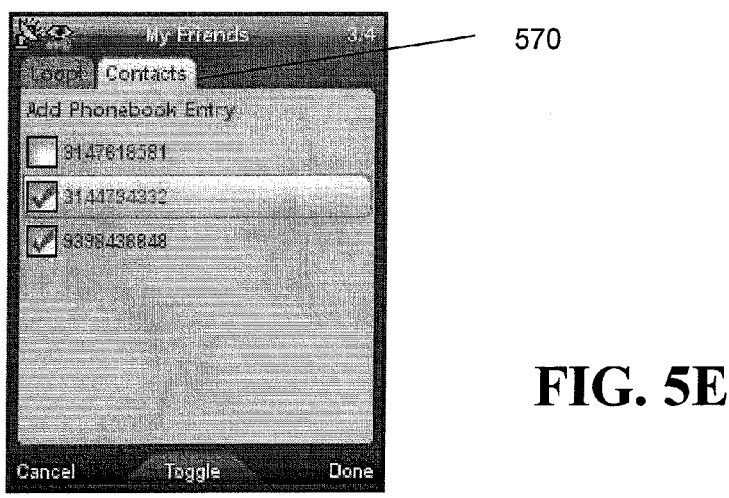
FIG. 5E illustrates the display of local phone book contacts for integration with the location-based manager process, under an embodiment.

As shown in FIG. 1C, embodiments of the location-based social network manager process 112 allow communication of location information from user's with friends who are outside of the service network 170 through an external network manager process 178. This process utilizes the resident messaging and contact capabilities of the client device 102 to extend a user's friends network beyond what is defined within manager process 112. This includes friends and contacts that may be defined within a phone contact book or through a messaging service, such as AOL instant messenger (AIM), or the like. The external network manager process 178 allows local contact lists to be integrated with the location-based manager process through a user interface that provides tabs that list friends for each type of contact list. FIG. 5D illustrates the integration of a local service friends list with the location-based manager process, under an embodiment. For the display screen shown in FIG. 5D, a list of friends from the user's AIM list 560 is displayed. Certain of these listed contacts, such as those shown next to the AIM logo are not members of the network 170 and thus utilize external client devices 172. Other local contact lists can also be used, such as contacts defined by the user and stored locally on the client device 102. FIG. 5E illustrates the display of local phone book contacts for integration with the location-based manager process, under an embodiment. For the display screen shown in FIG. 5E, a list of friends from the user's local phonebook list 570 is displayed.

The user can transmit location information to friends from either a local phone book or local service contact list using the external network manager process 178. In one embodiment, this location information is transmitted using an SMS transfer process in which the location information is provided as a short message that is displayed on the external friend's client device 172. In one embodiment, the location message may include a link to a map that shows the user's location, and that is accessible through a web browser on the client device 172 or other computer.

Transmission to the external client devices 172 is generally implemented using SMS (short message service) type messages by the external network manager process 178. In one embodiment, the SMS messages transmitted by the external network manager process are transmitted using a PPG push or SMS wake-up mechanism that launches the application straight from the SMS message itself. This allows the recipient to view any formatted location information or access any hyperlink or other utility directly from the SMS message itself provided that such utility is supported by the recipient's client device.

Security and Privacy Features

Because the location-based social network manager stores and provides access to sometimes sensitive personal identification information (PII) of a user to a network of people, certain privacy measures are included to allow the user to control who has access to this information. PII data may include information about the user (e.g., name, mobile phone number, personal profile, and other unique identifier information), as well as information used by the user (e.g., e-mail address, username, location information, and other network interaction information).

In order to promote the privacy of users, as well as the proper use of location and PII data, the system implements consent-based features, in which any use or disclosure of system data is strictly based upon receiving a user's authorization. A confirmation process confirms that such consent is actually received from a device that is to be located by the system. In one embodiment, the location sharing system is a closed system in which location determination and display services are supported in direct interactions between real and trusted friends. The service does not necessarily control any such interaction, but rather offers privacy settings and tools that encourages such interaction and allows users to define their networks. This mechanism is meant to strengthen the friendships between people who already know each other and spend time together, not to facilitate the creation of new friendships with people that subscribers do not already know. The security functions may be implemented in a privacy manager module within the location based social network manager 112 of server 104.

An important feature of the privacy functions include the ability to turn off the location sharing so that the location of the device is not broadcast to friends and cannot be determined by friends. The location sharing on/off feature can be triggered through the website, the mobile application, a customer service call, or via an SMS message, or the like. If the mobile communication device is lost or otherwise compromised, the system can disable access to the service by expiring the session ID and erasing all information from the device by means of an appropriate message or signal to the device.

In one embodiment, individual users are provided the capability of turning on or off their location sharing capability. This can be implemented through means of a toggle switch provided by the user interface on the mobile device or the web page, for each individual user of the system. This would allow a user to turn off location sharing for friend 1, but keep it on for friend 2, or to turn it off for a class of friends, and so on. The user interface also provides a method for the user to specify certain times or time periods in which location sharing is to be automatically disabled or enabled. For example, a user may specify that his or her location should never be shared between 11 pm and 9 am, or on weekends, or any other time parameter. Such restrictions can also be specified for location, such as enabling or disabling location based on area.

Along with location sharing itself, users may also turn off the automatic location updating process. This will cause the display of the last known location of the user if location sharing is enabled, but automatic location updating is not allowed. The automatic location update feature could also implement certain security mechanisms. For example, a user can turn-off or set to 'manual' the location update feature, in which case his or her location fix, time stamp and status is essentially frozen and displayed as a constant to the other users. In one embodiment, the system can be configured to make it appear as if the location information has been updated, though, in reality it has not been updated with the actual recent or current location of the user. Thus, an apparently updated message may read "Work, 15 minutes ago," even though this location may have been manually set days ago.

Through a privacy preference utility, the user can define which characteristics the user can share with others within his or her social network, and set filters to limit access of certain information to only certain users. For example, the user can specify which user or group of users within the network can see the location of the user by defining a "blocklist" of users who are not allowed to see the location information.

Figures 6A, 6B:
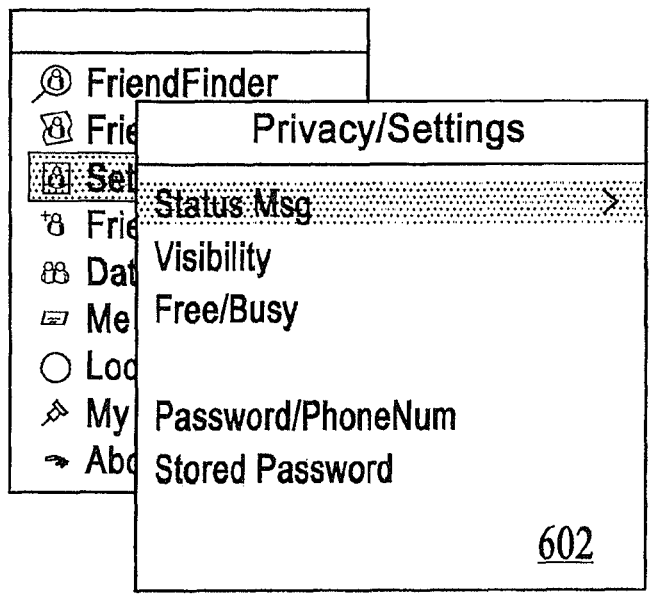
FIG. 6A illustrates an example of a privacy preference menu displayed on a mobile communication device, under an embodiment.
FIG. 6B illustrates an example of a privacy preference menu displayed on a web page, under an embodiment.

FIG. 6A illustrates an example of a privacy preference menu displayed on a mobile communication device, and FIG. 6B illustrates an example of a privacy preference menu displayed on a client computer, according to embodiments. As shown in FIG. 6B, the privacy and settings window 604 provides fields or commands that allow the user to specify a status message. This is the message that is displayed on the mobile devices of the other users, such as shown in FIG. 5A, and the web pages of other users. A short message can be typed in depending upon the constraints of the system and can provide a small amount of useful information. The visibility setting 608 allows the user to set which friends are allowed to view the user's location information, and can be applied to all or no friends, or specific friends specified on the blocklist. Display area 610 allows the user to list the friends in the blocklist. Display area 612 illustrates a simple free/busy toggle that allows the user to set his or her status as free or busy. The busy setting may be configured to block the user's information from his or her friends until the user becomes free. The interface 604 illustrated in FIG. 6A allows the user to set the privacy for the user's mobile device. Depending upon the constraints of the mobile device, the same or a subset of the privacy settings can also be displayed and accessed on the mobile device itself. The corresponding fields for the mobile device are illustrated in display window 602 of FIG. 6A.

As stated above, the service offers end user privacy settings to encourage interaction only between real and trusted friends. The system incorporates certain fundamental privacy features. First, the system requires that two users mutually consent to be friends in the system before any direct interaction (messaging, location sharing, event invitations, etc.) can occur. This request for mutual consent can come in the form as an invitation to the service, in the case that one of the users is not yet a registered user of the service, or as a request to be friends on the network, in the case that both users are already registered users of the service. Accordingly, the system is a "closed network." Besides, mutual consent, the service requires that the users input a user's phone number before being able to invite them to the service or request a friendship connection. This requirement accomplishes two primary objectives. First, it helps to encourage usage of the service with real and trusted friends. Since consumers are generally trained to be careful to whom they give their phone number, and knowledge of someone's phone numbers typically makes the existence of a real relationship more likely. Second, it limits the ability of users to either inadvertently or maliciously invite or request friendship from users that they do not already know. Thus the system avoids the two most difficult problems faced by many open social networks today: the ability predators have to spam users with friend requests, and "phishing," the creation and use of fake identities or multiple anonymous profiles in the hope that an unsuspecting user will accept a bogus friend request. The service will not send an invite or request until a valid phone number has been entered, and there is no other means by which to create a friend connection on the system.

In one embodiment, users are able to invite friends to join the service via SMS or e-mail messages after entering a valid mobile phone number of the prospective friend. Before sending out an invite on behalf of the user, the system checks to see that the invite-a-friend messages are sent from verified mobile numbers and accounts. If an invitee accepts an invitation and joins the service, the invitee automatically receives a friend request from inviter. Note that this exchange does not automatically make these parties "friends." The invitee must explicitly consent to the friend request to create a reciprocal friendship connection. No information sharing occurs through the system until both users mutually and expressly consent to a friendship connect, and the sharing of location information.

Figure 6C:
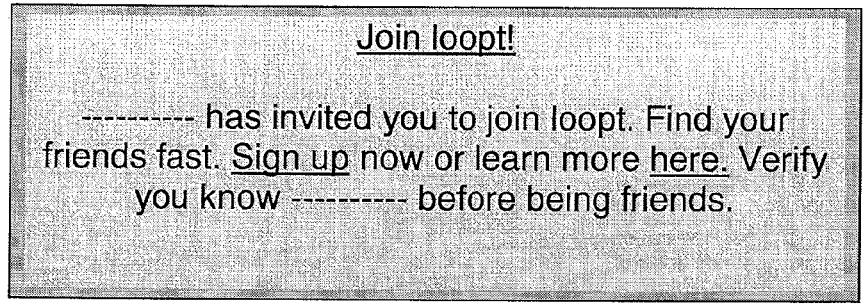
FIG. 6C illustrates display windows containing an invite-a-friend message in SMS format and as an e-mail message, under an embodiment.

In general, friend requests may be sent over the web via email or the mobile device via SMS (SMPP connection). Thus, an invitation may be sent in a number of different formats. FIG. 6C illustrates a display window 617 containing an invite-a-friend message in SMS format that may be sent to user, under an embodiment. If the user is not currently a subscribed member, the message provides access to information and a sign-up page. If the user is a subscribed member, he or she is directed to a page that allows acceptance or rejection of the invitation. Alternatively, the invite-a-friend message may be sent as an e-mail message. Window 619 of FIG. 6C represents a display window containing an invite-a-friend message sent as an e-mail message, under an embodiment.

In order to successfully send a request the inviter must already know the invitee's phone number. Accepted friend requests make sharing location an option, not a requirement. The ability to share location information is disabled until both users mutually and expressly consent to sharing location. The service checks that the request is initiated from a confirmed account, and that the friend request is being accepted from a valid registered user account and mobile device. During the invitation process, if the system determines that the invitee is already a registered user, the system provides the username and phone number of the inviter, and checks to see if the phone number is in the personal address book of the invitee. If it is, the name that is entered in the address book is then revealed.

When a user initiates friend request approvals, a reminder message may be displayed on the web and mobile application. Such a warning may state that the service allows other people to know where you are, and that for privacy the user should always make sure that they know who they are sharing their location with. The system can be configured to send an SMS reminder to the user reminding him or her that they are sharing their location. The system can also send an SMS message at an unpredictable time after a new friendship connection is created or a change of password has occurred. Other warning or notification messages can be sent to regularly remind the user about how to use the service's privacy tools. These can include warnings to users that before they close the application that the service will update their location in the background unless they request to completely turn off location sharing; regular text messages notifying users that the service is running on their phone, along with instructions for canceling the service, and other similar warnings.

Figure 6D:
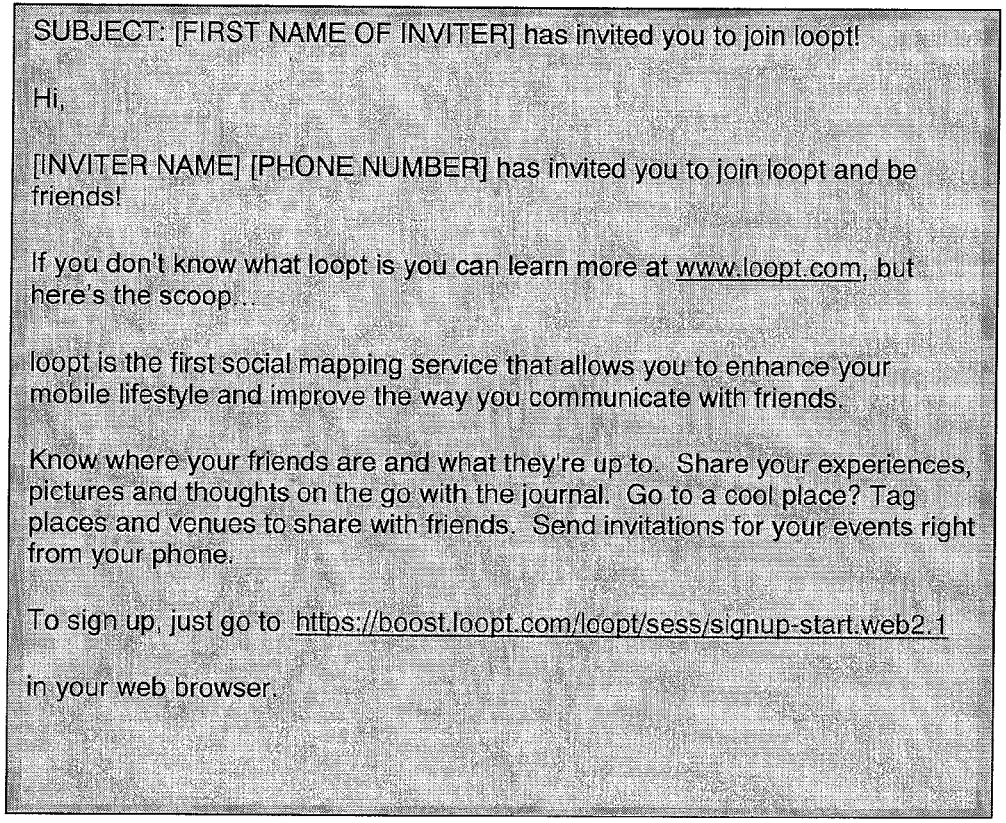
FIG. 6D is a flowchart illustrating a method of establishing a friendship link between two users, under an embodiment.

FIG. 6D is a flowchart illustrating an overall method of establishing a friendship link between two users, under an embodiment. The first user, or "inviter" registers or logs in to the system as a registered user, block 621. The registration mechanism can be any type of subscription based mechanism that restricts access to system services and validates a user based on certain identifying criteria. Once logged-in, the inviter can then send an invitation message to a second user, the "invitee", block 623. The invitation message can either be an SMS or e-mail message, as illustrated in FIG. 6C, or it can be any other type of invitation message recognized by the system. In one embodiment, the invitation method includes or references a specific item of information that is not well known about the invitee. This can be the invitee's phone number or similar data element that is typically known only to true friends or trusted associates of the invitee. The second user receives the invitation, block 625, and either accepts or rejects the invitation. If the invitee rejects the invitation, as determined in block 627, the invitation process ends, and no friendship link is established. If the invitee accepts the invitation, the second user acknowledges acceptance and shares his or her location information with the inviter, block 631. At this point, the system establishes a friendship link between the first and second user, block 633, and appropriate database table entries are created in the database.

As shown in FIG. 6D, the system requires that any two users mutually consent to friendship before location sharing is even activated. Even when two users mutually consent to friendship, users can choose to share or hide their location from their friends at any time. When users consent to sharing location information, they have the option of three visibility settings. They can choose to share their location with all, some, or none of their friends, as shown in FIG. 6B. The system is configured to only allow its members to browse the profiles of friends and friend-of-friends. There is no "open browsing" in which people can search for individuals they don't know in order to try to establish a new "friendship." In one embodiment, the user profiles contain personal, contact, and professional information, and favorite places, but they do not contain location information, and members can not see the location of anyone who is not explicitly a friend who has chosen to share location information with them. Restricted browsing accomplishes two primary objectives. First, it reinforces the notion that the service is a closed network meant to be used with real and trusted friends. An open network with unlimited browsing invites users to peruse profiles and information of users that they do not know. Friend-of-friend browsing does not allow for that behavior. Second, users generally feel more comfortable sharing information in a more private network. The information users are willing to share with friends and peers is vastly different than the information they should be sharing with the open community. Once a friends have registered with each other through the service, they may be referred to as "validated" or "registered" friends or users.

FIG. 13 illustrates an example of a user table and an associated location table, under an embodiment. The user table 1302 contains the listing of the users with certain key information, such as name, user ID, and phone number, among other possible identification information. Certain databases within the system store sensitive user information, such location information and dating preferences, and the like. To ensure privacy and security, these tables are not explicitly associated with any particular user. This ensures that anyone gaining unauthorized access to the databases within the system will not be able to associate any particular sensitive information with the corresponding user. This correspondence is provided only by way of an encoded linkage structure. Thus, as illustrated in FIG. 13, there is a code denoted "linkA" for each user. When a user is created within the system, the unique linkA code is generated for that user. It is a randomly generated alpha-numeric text string that is unique to each user. The user also provides a password, which is not itself is not stored within the system, but is instead used to encode or link the table entries in the user table 1302 to other data objects in the user's database. Thus, in one embodiment, the linkA code is used by the system to link to other database tables holding sensitive or confidential information for the user within the system.

Because the social networking system can provide location information for individual members of a network, certain privacy features are provided to allow a user to mask or hide a user's actual location information, or limit access to the user's location information. This is an alternative to turning off the location display feature entirely for a user. In one embodiment, a fuzzy location feature is provided. This function adds a random offset to the actual location of a user, and allows the user to share his general location information with other users but hide his exact location. For example, the offset could be one mile, thus the user's location would be offset by a mile when displayed on another user's mobile communication device. The offset value is used until the user moves out of the offset radius. The offset value is then reset and used until the user moves outside of the boundaries defined by the previous or new offset value. The user is randomly displayed in any location within the offset radius, and can be displayed as a large icon encompassing the entire fuzzy area or as a focused icon randomly placed within the radius. This prevents other users from being able to guess a user's location by selecting the location in the middle of several densities.

In another embodiment, the display obfuscation method includes snapping a location indicator to set location, such as the upper right corner of a grid. This would prevent so-called "centroid" attacks on the system to try to decode the user's location. Location information can also be obfuscated on the basis of other location parameters, such as zip code, city, region, and so on. In this case, an icon or location indicator would indicate that a user was in a certain region or zip code, but would not provide the location of the user within that area. Other obfuscation techniques could also be implemented to mask or obscure the location information for users or groups of users. For example, groups of close points on a map, either users or points of interest on a map may be clustered. A key would then be needed to scroll through the clustered points.

In certain deployments, such as those involving many mobile device users based around one or more server computers, the amount of data transmitted throughout the system can be very high. If many users constantly change location and/or message other users on a frequent basis and at approximately the same time, the network traffic could easily overwhelm the system causing lock-up conditions or drastic slowing of network traffic. In one embodiment, the location-based social network manager process employs a data compression mechanism to compress the location and message data to reduce the network traffic between the mobile devices and the server computer. The data compression mechanism, according to one embodiment recognizes frequently used patterns and assigns them a number between 0 and 255. These patterns can thus be represented in one-byte. A dictionary of the 256 most frequently used patterns is generated and stored on one or both of the server and client devices and shared between the client and server. In alternative embodiments, other known data compression methods can be used to compress the network traffic between the server computer and the client computers and mobile communication devices.

Messaging Functionality

The mobile communication device can also be configured to provide other functions or utilities that facilitate user interaction with friends based on the location information displayed on the mobile communication device. For example, a messaging utility can be used to send and receive text or voice messages from a friend or groups of friends within a displayed area. In one embodiment, the location-based social network manager process 112 includes a messaging module that allows messages to be sent to friends on the device where they are most likely to see it. The messaging module utilizes the group module and the geographic location functionality of the mobile communication device. The message can be sent as a text message or instant message (IM) between mobile communication devices, or as a web message between client computers. In general, messages can be transmitted between any of the computers and devices illustrated in FIG. 1, thus, messages can go from mobile to mobile, web to web or mobile to web.

Figure 7A:
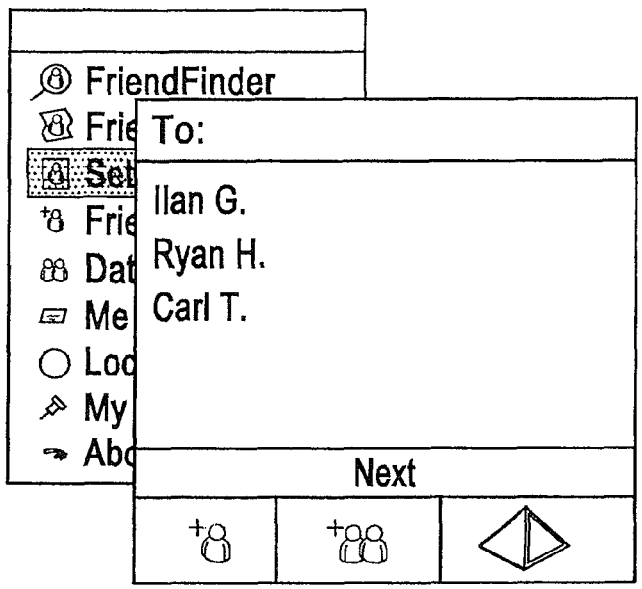
FIG. 7A illustrates an example of a messaging function for implementation on a mobile communication device, according to an embodiment.
Figure 7B:
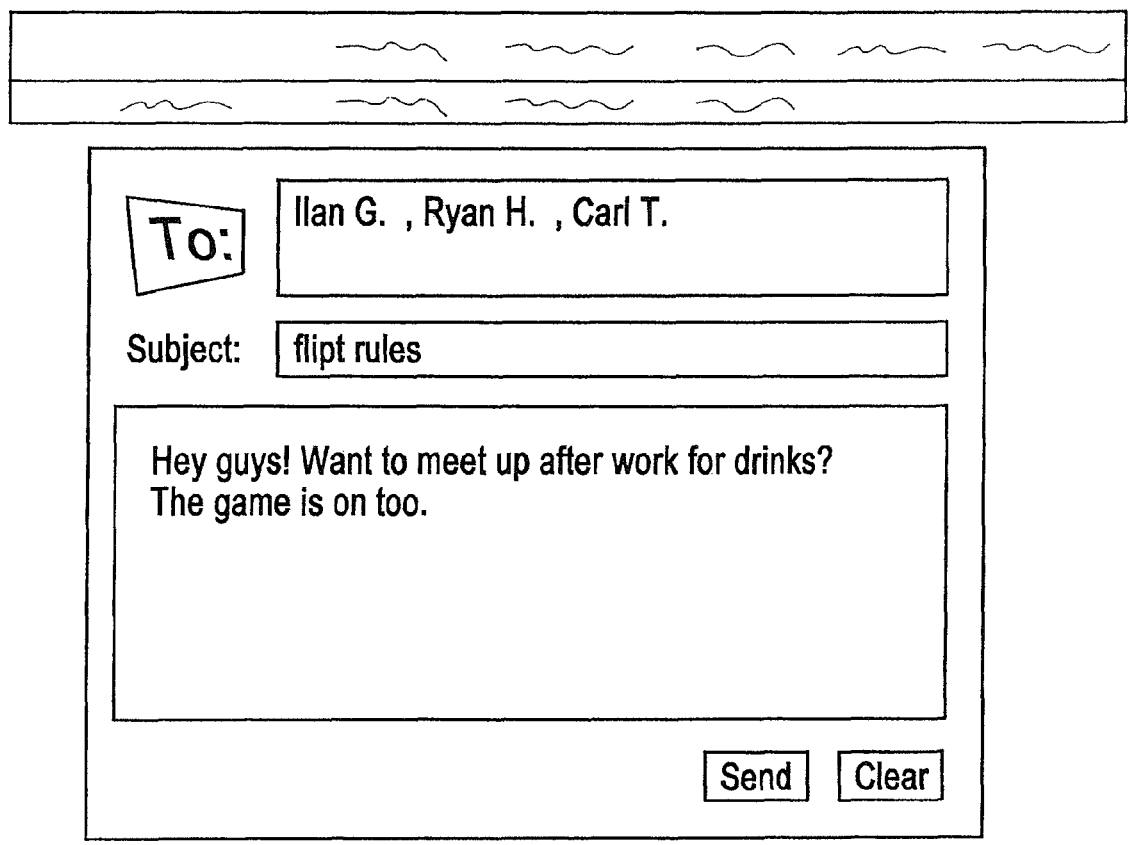
FIG. 7B illustrates an example of a messaging function for implementation on a web page, according to an embodiment.

FIG. 7A illustrates an example of a messaging function for implementation on a mobile device, and FIG. 7B illustrates an example of a messaging function for implementation on a client computer, according to embodiments. As shown in FIG. 7B, the client computer based messaging function can be provided as a simple user interface with fields for the recipients, message subject, and message. An attachment utility can also be included to allow the transmission of attached data objects, such as documents, files, pictures, and the like. The mobile communication device version of the messaging function is typically a simple text based utility that displays the recipients and the text message to be sent, and if space is constrained, these display areas may be provided in successive screens of the device, as shown in FIG. 7A. Message data can be sent via standard SMS protocol, data transfer, or any other suitable messaging protocol.

In one embodiment, the social network manager also includes an event manager module that allows a user to program places and/or events of interest. The event manager allows the user to create and manage various events using date and location information and send invitations or messages regarding the events to friends using the grouping function and messaging utilities of the system. Thus, the event manager module utilizes the group module and the geographic location functionality of the mobile communication device. Lists of public events can be provided by separate event servers accessible to the server, client computers or mobile devices of the system 100, or they may be programmed into an event database stored in data store 120. Typically private events are created and stored by each user, and each user may store events or other similar information in their own user provided database. Alternatively, events can be stored in one or more separate event databases (public and/or private events) within database store 120. If permission is granted, the database functionality of the mobile devices allows a user to view events created by other users or those that are public. Public events are typically events that are provided by users or partners that provide event information.

Figures 8A, 8B:
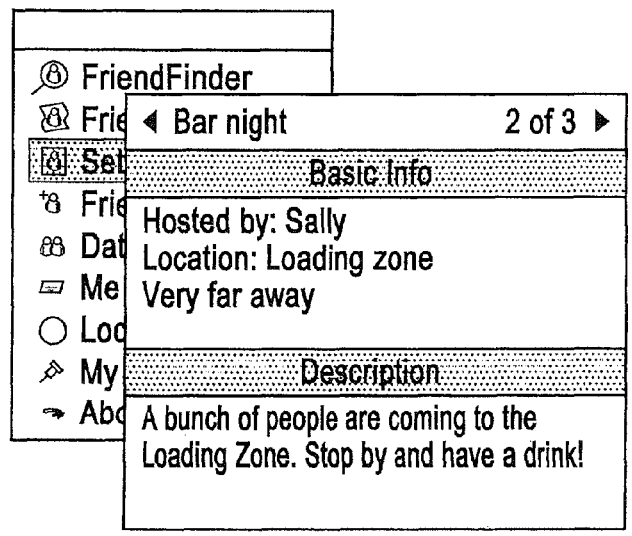
FIG. 8A illustrates an example of an event manager function for implementation on a mobile communication device, according to an embodiment.
FIG. 8B illustrates an example of an event manager function for implementation on a client computer, according to an embodiment.

FIG. 8A illustrates an example of an event manager function for implementation on a mobile device, and FIG. 8B illustrates an example of an event manager function for implementation on a client computer, according to embodiments. As shown in FIG. 8B, a display area 810 displays a description of the event including the time and place of the event, as well as any other relevant information. The location of the event is shown as an icon 813 on a map displayed in display area 812, and the date of the event can be shown on a calendar displayed in display area 814. Similar information can be provided through the client side program for display through the mobile communication device, as shown in FIG. 8A. Depending upon the constraints of the display the event information can be provided in a series of screens. Additionally, certain geographic parameters can also be provided, such as relative distance to the event based on the location of the mobile communication device as well as the location of the event on the map.

User-Generated Locations

In one embodiment, the location-based social network manager includes a user-generated location feature, feature that allows users in the network to program and share private and possibly, public places of interest (POI) with one another. A database specifying places and/or events can be stored in data store 120. This database can store different items of information relevant to a place of interest, such as, location, hours, products/services provided, and so on. This information can be provided to a user in a "pull" model, in which the user searches for the stored user-generated location through the web page or mobile communication device. Alternatively, the information can be provided to the user in a "push" model in which the server sends relevant POI information to a user based on a user condition, such as if the user goes near a particular POI. The POI feature utilizes a reverse geocoding method in which the system determines the user's location, and correlates the location coordinates to entries in the POI database to determine which bar, restaurant, or other where they may be. This POI information can then be displayed on the user's friends mobile communication devices as the location of the user. This allows the system to automatically determine and display the location of a user and to share more descriptive and precise location information without requiring the user to manually type anything. For example, using the friend finding and messaging functions, a user can send a message to his or her friends simply saying that they are near the "ABC" bookstore instead of any address or other location information. In determining the location of the user, the server looks up the latitude/longitude information of the user, matches it to the corresponding POI, and sends the POI information to the other users in the network. In one embodiment, the reverse geocoding method includes a snap-to function that takes a lat/long or street address or city, and snaps to the nearest POI that may be saved by the system or locally on the client device.

The storage of user-generated location information in a database allows a user to search for and find user-generated places almost automatically using the location finding capabilities of the mobile communication device. The user can specify a POI to be found, and the system will display the location of the POI relative to the user. The user can then bring up the relevant information relating to the POI, such as hours, prices, and so on. User-generated places can be private or public. Public user-generated places are those that are defined or provided by the server or third party providers. Private user-generated places are those that are defined by individual users. Depending upon the privilege settings, a user may be able to access his or her friend's user-generated places.

In one embodiment, the user-generated location feature provides a tagging and feedback sharing mechanism that allows the user to tag a place and provide feedback. Tagging involves noting the location of a place or capturing an image of the place and downloading it to the server. User feedback can be provided as text messages or rankings using a user-defined or pre-defined template that is stored in the user-provided database or separate POI database. This database can be made available to friends or other users of the network, depending upon the preferences set by the user. Various messages, such as reviews, advertisements, and the like can be associated with each POI and displayed upon selection of the POI by the user. The POI and messaging features also enable users to send itineraries of trips to groups of friends. This greatly facilitates the planning and communication of group trips. POIs can be displayed on a map as shown in FIG. 2D.

In one embodiment, the location-based social network manager includes a review and recommendation function that allows each user to review and rank events or user-generated places so that this information can be shared with the other users. When a user visits a tagged POI (or attends a tagged event), he or she can provide a numerical (keypad) ranking of 1-9 and/or write a short summary of the place. The server process can also be configured to automatically request or remind the user to provide a ranking or summary of the POI upon the user's next system login through the web site or the mobile communication device. For each POI, the server compiles the rankings and summary reports and makes these available to any user who desires to see them. The server process can also be configured to compile statistical profiles or qualitative profiles of different tagged user-generated places once enough ranking or summary information is available.

The server process can also include a machine learning component that can provide personalized ranking and reviews for individual users based on the identity of the reviewers. This process includes a Bayesian trust network component that learns each user's trust levels with respect to the other user's. Each user may trust certain of their friends with respect to certain types of user-generated places. In this case, the system will weight the ranking provided to the user based on the identity of the reviewer if the reviewer opinion is particularly trusted with respect to the tagged POI. In this manner, personalized and dynamic ranking and review profiles can be established for each POI based on the users and reviewers.

In one embodiment, an auto messaging mechanism sends an alert to a user based on the POI of another user. For this embodiment, when the user tags a particular POI, the server sends an alert to that user when a friend of the user gets within a certain distance of the POI. In this manner, the user can call, send a message, or arrange to meet with his or her friend at the POI, without needing to go through the trouble of pre-arranging a meeting. This facilitates spontaneous networking among users and their friends at particular user-generated places. It should be noted that user-generated places can be any type of location, such as retail establishment (store, restaurant, club, theater, gas station etc.), building (office, house, etc.), public resource (library, museum), street corner, object (e.g., ATM kiosk, post box), and the like.

Several interactive network features are facilitated through the use of the location determination and message capabilities of the mobile devices. For example, not only can friend locations be displayed on a user's mobile device, but an alert function can provide a graphic or audible alert to the user when a particular friend has entered a user determined area or region around the user. FIG. 9 illustrates an example of an alert function for the location-based social network manager process, under an embodiment. The user can specify a radius 906 around which he or she should be notified if a friend enters. The server computer then performs a periodic comparison of the user's location compared to that of his or her friends to determine if any of the user's friends are within this specified radius. The user location and radius are displayed on map 904. When a friend enters this radius, as determined by the server computer, a message is sent from the server to the user over network link 908 and displayed on the user's mobile device 902. The alert function can also be used to facilitate other interactive features, such as displaying or alerting the user to the location of user-generated places in the displayed area or the time and location of events of interest when the user enters a particular area.

The user interface screens illustrated in FIGS. 2A through 9 can be configured in any number of ways depending upon the constraints, requirements, and preferences of the system and system integrators. Various types of icons can be used to specify the identity and status of users and friends on the mobile devices and client computers of each user. For example, a portion of the mobile device display, such as the top of the menu may include one or more icons indicating whether the location of the device has been determined and whether or not the user is sharing his or her location information. The icons can be color or shape coded to define all of the different states available with regard to the user's location and status information. Likewise, the map display and icons for friends, places, events, and so on can be customized depending upon the needs and preferences of the user. Scrolling and scaling functions for control of the displays on both the mobile device and client computers can also be customized to utilize the input/output interfaces available on the different devices that can be used in conjunction with embodiments of the location-based social network manager process.

The display process may utilize various smart mechanisms for panning, zooming, scaling, or otherwise displaying dynamic (time and space) information on inherently small form factor displays (i.e., mobile phones). For example, a smart pan and zoom feature may utilize an automatic zoom out mechanism that uses a zoom box instead of a cursor when a user pans off a screen. Then display then zooms back to the original zoom level when the user stops panning.

Location Determination

In one embodiment, each mobile communication device 102 includes a device location module that allows the mobile communication device to determine its own geographic location so that the location of the user operating the device can be displayed on a map on the device, as well as on the mobile devices and client computers of other users in the network. In one embodiment, the location information for mobile communication device is transmitted and stored in the server computer of the network. The location information for all of the users is then transmitted from the server to the mobile communication devices based on the filters and preferences established for each of the users.

For an embodiment in which the network 110 is a cellular phone network, and the mobile communication devices are cellular phones or cell based communication devices, the device location module is a cell ID positioning program that determines the location of the device relative to the nearest one or more cell transmitters to determine a location fix of the device. Depending upon the capabilities of the system, location accuracy can be provided on the order of one to two hundred meters to actual location. If accuracy is not sufficient, the user can be provided with their approximate location either through map or text display and then input their actual location using street address, point of interest, or latitude longitude information.

In one embodiment, the location determination module is a GPS (global positioning system) circuit that determines the location of the mobile communication device using GPS methodology. GPS circuits are capable of updating a device's location on a real or near real-time basis. However, such continuous updates can impose a great deal of processing and communications overhead on the device and the network. Moreover, for a device that is capable of displaying the location of any number of other users, such continuous update methods are highly impractical. If the actual location of every friend in a network were required to be determined every time the user brought up a map, the time and cost requirements would likely be excessive. For embodiments in which the communication network comprises a cellular phone network and the mobile devices are cell phones, the location determination module may be an assisted GPS or "A-GPS" module that uses an assistance server and cell tower that helps the GPS receiver in the phone perform tasks of range measurements and position solutions.

In general, the task of determining location in a mobile device and transmitting location information to a server can utilize a significant amount of power and processing resources, as well as generate a great deal of network traffic to the server. For systems with a large number of mobile devices, polling each device at a set frequency (e.g., every three minutes) could result in an overwhelming amount of network traffic. To minimize the power usage and network and processing overhead, an embodiment of the location determination module employs a GPS polling method that polls the device location of each mobile device in the system as infrequently as possible to thereby impose a minimum load on the carrier networks. The GPS polling method is an iterative polling method that employs a caching mechanism that updates a user's location based on known location information and user behavior. Instead of polling each mobile device in the network at a fixed frequency, the frequency of the location polls for each device depends on the movement and/or activity (interaction with the server) of the user. If the user is stationary and inactive the polling frequency is minimized to result in fewer GPS location polls. If a user is on the move and/or interacting with the server computer, the polling frequency is increased to result in more frequent GPS location polls. A difference value can be used to determine whether the updated location information is stored in the cache and/or transmitted to the server computer, thus adaptively utilizing system resources depending upon the amount of movement or activity of the user.

Figure 10:
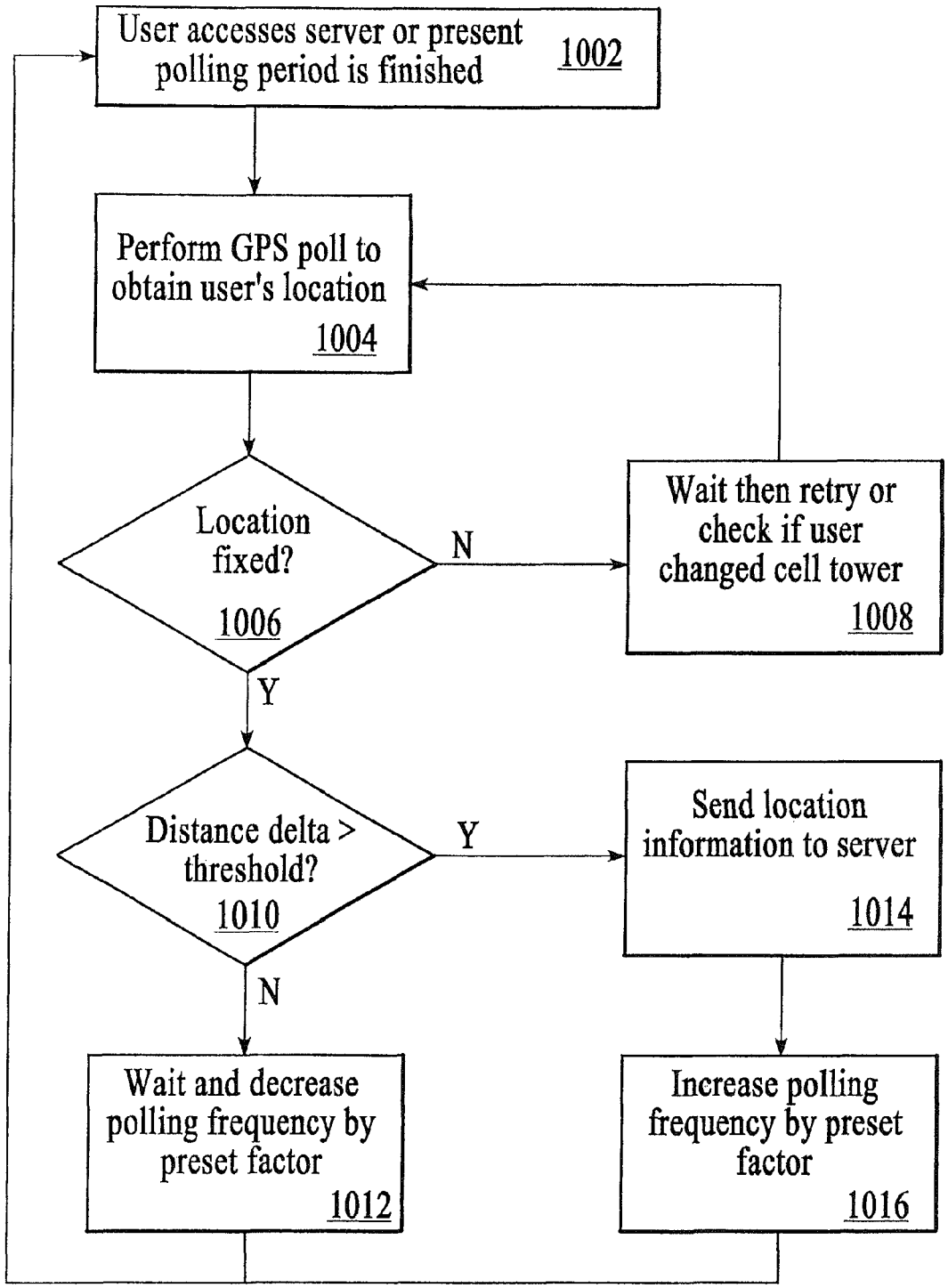
FIG. 10 is a flowchart that illustrates GPS polling for a location determination module, according to an embodiment.

FIG. 10 is a flowchart that illustrates GPS polling for a location determination module, according to an embodiment. A location poll operation can be performed each time a user forces a location update from his mobile device, accesses the server computer from the mobile device, or at the end of a present polling period, 1002. In the event of any of these occurrences, the user's present geographic location is determined, 1004. In certain cases, a location fix might not be obtained, such as due to lack of signal, loss of device power, and so on. In step 1006 it is determined whether or not a location fix was obtained. If not, the device will wait (enter sleep mode) for a preset period of time, such as two minutes, and then retry the location fix. If a location fix is not obtained after a number (e.g., five) of tries, the system will determine whether or not the user has changed cell tower location, 1008. If so, the system will send the cell tower location to the device and the location fix will be attempted again, otherwise, the device will longer period sleep mode before retrying.

If a location fix is obtained, a smart polling process is executed wherein the change in distance (distance delta) of the user from the present location and the previous location is used to set the polling frequency, and the location information is updated to the server computer. In step 1010 it is determined whether the new fixed location differs from the previous location by a threshold distance. If the distance delta is not greater than the threshold value, it is assumed that the user has not moved by an appreciable amount, and therefore no location update to the server computer is necessary. In this case, the location polling interval is increased by decreasing the GPS polling frequency by a preset factor. This results in fewer GPS location pulls for a relatively static user. The process then continues from step 1002 at the end of the first new polling period. If, in step 1010, it is determined that the distance delta is greater than the threshold value, then it is assumed that the user has moved by an appreciable amount. In this case, the location information is transmitted to the server, 1014. The polling frequency is also increased by a preset factor depending upon the current polling frequency. If the present polling frequency is slow, it can be increased to track the user. The process then continues from step 1002 to obtain a new fix at the end of the shorter period. If the user slows down or stops, the distance delta comparison step 1010 will cause the polling frequency to decrease in accordance with the reduced movement of the user.

The initial and modified location polling frequencies can be set to any value in accordance with the requirements and constraints of the server and mobile devices. For example, an initial polling interval could be set to 20 minutes, and the wait or sleep period could be set to anywhere between 15 seconds to 300 minutes. Likewise, the threshold distance represents the minimum distance that the user has traveled to require that the system update his or her location, and can vary from a few meters to a few kilometers, or more. The increase or decrease in the polling interval performed in steps 1012 and 1016 can vary from 100% of the present polling period up to a certain maximum number of minutes, such as between 80 minutes to 300 minutes, depending on certain factors such as time of day, system requirements, and so on.

The GPS polling method illustrated in FIG. 10 provides for efficient use of network and mobile device resources based on each user's activity and movement. The more active or more mobile a user is, the more frequent the GPS location determination operations occur. Likewise, if a user is stationary or less active, the GPS polling frequency is reduced. This results in less use of GPS services and network usage. Such polling can also be tailored depending on a user's sleep or general travel or commute patterns.

In one embodiment, the latest location information for a user is stored as a data entry on the mobile communication device and sent to the server for temporary or permanent storage. Each location entry is stored, at least temporarily, in the location database 126 on the server computer. The server computer can be configured to store only the latest location for the user, or all previous locations of the user in a location log. The location log entries include a time stamp based on the location poll time and the latitude/longitude (or other location indicator) at that time. To reduce memory usage successive unchanged location entries can be discarded so that only changes in location are stored in the location log. Security or privacy functions can be implemented to block the access of location history information to anyone but the user himself.

Data Synchronization and Privacy

In one embodiment, the location-based social network manager process 112 includes an intelligent caching and synchronization function that caches critical data with normal updates to each mobile communication device in the network. Because a user can update their own data on either the mobile communication device or through the client computer, and other members can also impact a particular user's data, a synchronization function is necessary to ensure that the information available to the user is as up-to-date as possible while minimizing network traffic. Data between the user's mobile communication device and account data stored on the server and/or client may be out of sync because the user changed the data on the web site, but not the mobile device, a friendship request from another user was confirmed, or some other input from another user was input to the system. Each class of information to be synchronized is assigned a version number, which is maintained by both the server computer 104 and the respective mobile communication device 102. Each time a mobile communication device makes a request to the server, its data packets are prepended with a set of synchronization bytes. The server checks all of these bytes. If the data is out of sync with data that is on the server, the updated information is prepended by the server computer for transmission back to the mobile communication device.

Figure 11:
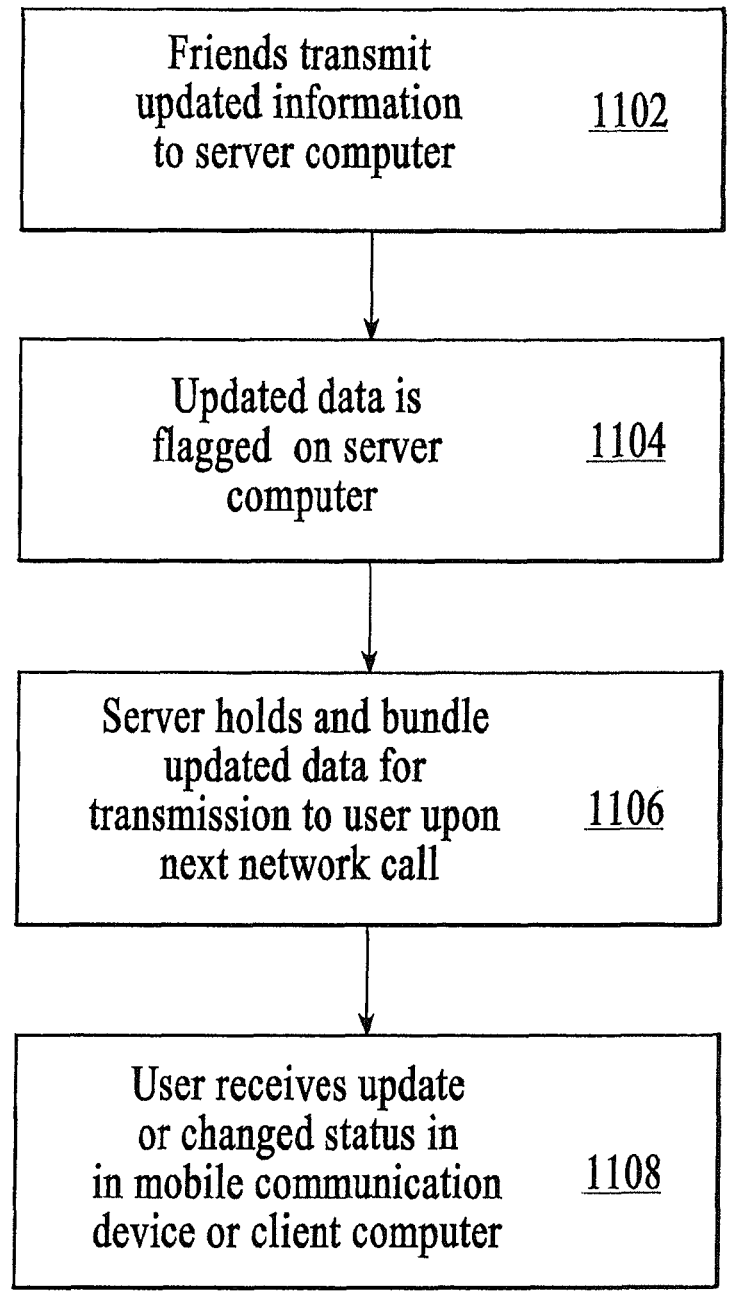
FIG. 11 is a flowchart that illustrates an example of sending updated information to a user's mobile device, under an embodiment.

Certain important data is cached on the mobile communication device itself. This includes the status of a user's friends on the network and other similar data that is small in size and frequently accessed. The caching mechanism reduces the network traffic between the mobile communication device and the server computer, thereby increasing network efficiency, minimizing open sockets on the network, and providing a more fluid and immediate user experience through the mobile communication device. The synchronization function is used in conjunction with the mobile communication device cache to ensure data coherence between the user's mobile communication device and the server computer. FIG. 11 is a flowchart that illustrates an example of sending updated information to a user's mobile device, under an embodiment. In step 1102, any friends with updated information transmit the new data to the server computer. The updated information can be generated by a new location fix or through a message transmitted over the system or a parameter change in the user's database. For example, an information update can be performed by the user inputting certain new or modified information directly into his or her mobile device, or automatically through a friend update, such as a status change caused by a friend changing location, sending a message, or changing the status availability flag. The updated information is transmitted from the mobile communication device to the server computer. On the server computer, the data is updated and flagged as updated data, step 1104.

Although the server computer can be configured to transmit the updated information along to the user as soon as it is received, in a preferred embodiment, the updated information is sent only upon user activity to reduce network traffic and tailor data updates based on user demand. If a user is not active, it is assumed that the user does not necessarily need real time updates of changed friend information. Any user activity with the server computer can trigger an update, such as powering on the device, making a request for services, forcing a location fix, or a performing a refresh operation, and the like. Upon receiving a network call from the user, the server computer bundles all of the flagged and held updated data and transmits it to the user. Thus, in step 1108, the user receives the updated data or changed status for his or her friend on the mobile device or client computer.

Figure 12:
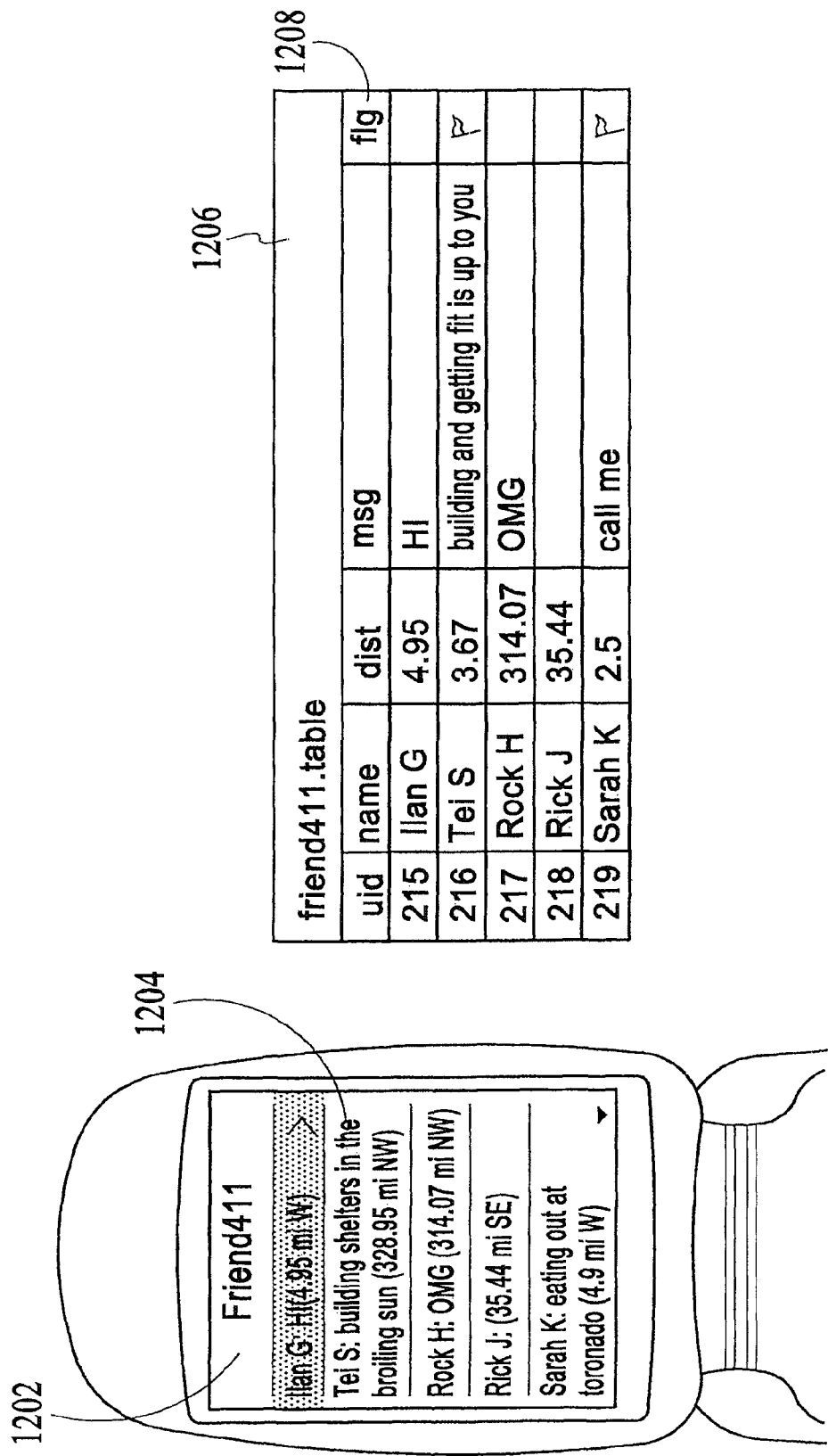
FIG. 12 illustrates an example of a user update on a mobile communication device and a corresponding update table, under an embodiment.

FIG. 12 illustrates an example of a user update on a mobile communication device and a corresponding update table, under an embodiment. The display area 1204 of mobile communication device 1202 displays the status information for a number of friends. This information is cached on the mobile device itself. The status information may be updated as a friend changes location or sends a message or signal that indicates a change in his or her status with respect to the user of the mobile communication device. The status information is stored in a corresponding friend information table 1206, which is stored on the data store 120 of the server computer 104. As shown in FIG. 12, the information table 1206 stores the user ID, and name of the user's friends, as well as their distance to the user and any message text that was sent to the user from each friend. The table 1206 also includes a flag column 1208 to indicate the friends which have updated status information transmitted from the user's mobile communication device. For the example shown in FIG. 12, message information for users 216 and 219 have been updated as indicated by the flag icon in column 1208, as well as the graphical overwriting of the message in their respective message columns. This flagged data will be sent to the user upon his next interaction with the server computer.

Journal Entries

In one embodiment, the location-based social network manager 112 includes a journal feature that allows users to share geo-tagged user-generated content, such as notes, pictures, video/audio clips, reviews and ratings, attended events and the like with friends within the network. The journal feature includes an automatic time stamp and location stamp function that tags or labels all entries with the date, time, and location of creation. In one embodiment, the journal comprises user-generated entries that are written in chronological order and commonly displayed in reverse chronological order. In one embodiment, the journal comprises user-generated entries that are displayed on a map on the mobile device or Website. The journal entries might be used to provide commentary or news on a particular subject or function as a personal online diary. The journal can combine text, images, and links to other blogs, web pages, and other media related to its topic. As with standard blogs, the ability for readers to leave comments in an interactive format is an important part of the journal, thus users can view their friend's journal entries on the mobile application or the server website.

A user can create user-generated content directly on their location-aware mobile device. This content may be a text written into the device using the text entry capability, or it may be a picture or audio/video clip using the camera or audio/video recorder of the device. Content may be combined so that pictures with notes or illustrated commentary can also be created. Content may also be created based on ratings/reviews a user gives a particular place or an event that a user attended in the past. The user can include location information by either typing such information into the entry, or the journal entry can be automatically annotated or "tagged" with the location information that is provided by the location determining circuitry of the device. The journal entries are transmitted to the location-based social network manager server 104 through the cell network 111.

For the embodiment in which the user accesses server 104 through a client computer 106, the user-generated content can be uploaded from the mobile device or directly input by the user. The location information can be attached by direct input or by clicking the appropriate location on a displayed map. Location information may also be automatically annotated or "tagged" with the location information that is provided by the user's mobile device or by the location of the client computer using WIFI triangulation and/or IP address location.

Using the friend database provided by the system, friends of the user can view that user's journal entries from their own mobile devices or Website. Users can view their friends' journal entries in list form. These entries can be displayed as thumbnails of photos and snippets of text or comments. The entries in a journal can be sorted by various parameters, such as time stamp. Users can also view their friends' journals on a map on the mobile device. To view the details of an entry, a user can select an entry to view the entire entry. Through the web interface, users can view their friend's entries on interactive timelines and maps. Entries are displayed on a timeline that shows the chronology of events and/or as pins on a map to indicate where the entries were created.

Users can comment on the journal entries of one another. These comments can be displayed in a number of ways, such as a thread in the user's journal. Other users or the owner of the journal can then respond to the comment or provide subsequent comments. The journal management process includes an alert feature. This feature allows a user to set alerts receive a notice through the web interface or through an SMS message that a friend has created a new journal entry. The system can also be configured to generate an alert when a friend has commented on their journal entry or a friend has replied to a comment. An auto-alert can also be set to alert a user when he is passing by or within the proximity of the location of a friend's journal entry and places of interest recommended by a friend.

In one embodiment, the journal application executes as a local resident program on the location-aware mobile device. Alternatively, it may be executed as a server-side process from server 102. Journal entries and any associated files or objects are stored in a journal database for each user in a data store, such as datastore 120 of FIG. 1.

Home Screen Feeds

Figure 14:
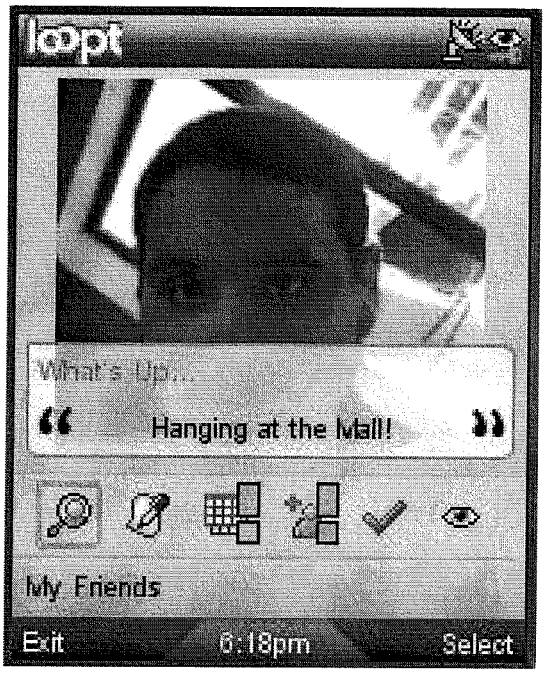
FIG. 14 illustrates an example of a home page displayed on a client device, under an embodiment.

The location-based network manager process generally provides a home screen that is displayed on each client device 102. This screen displays certain elements such as a background picture, which can be the user's profile picture or any other suitable background picture, as well as the user's current status message and menu links to other utilities of the service. FIG. 14 illustrates an example of a home page displayed on a client device, under an embodiment. A friend map icon allows the display of a friend map that displays the location of friends of a displayed map, and a friends list that displays a list of friends within the system. A settings icon allows the user to edit their profile, a privacy icon allows the user to hide their location with a single click, refresh their location, or share their location with specific friends. Other icons or menu items allow the user to set their status, add pictures, set their location, add friends, define groups, enter journal entries, and other functions.

Figure 15:
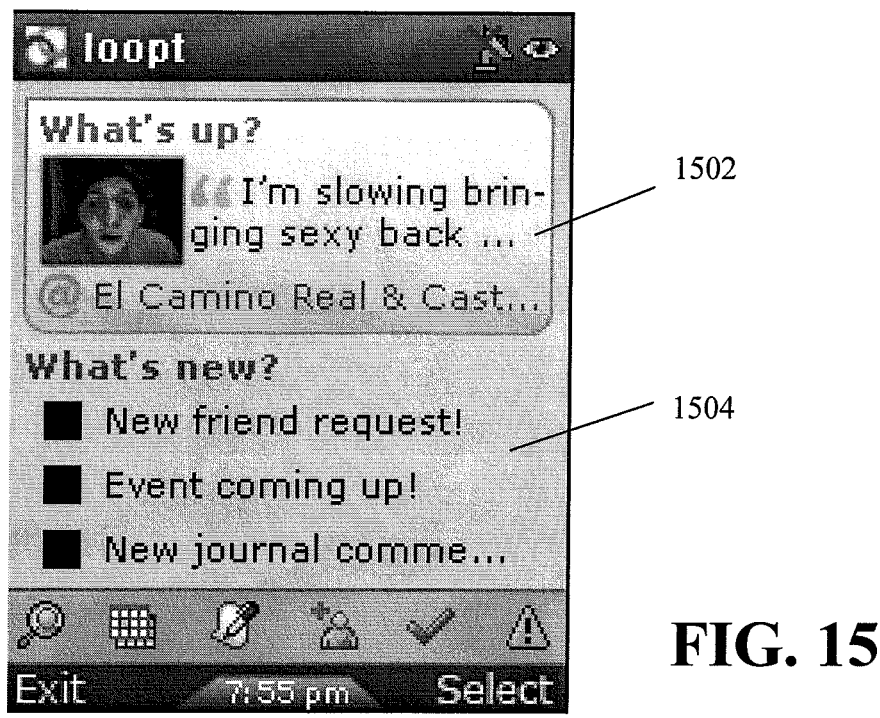
FIG. 15 illustrates an example of a notification page from the home screen feed process, under an embodiment.

In one embodiment, the location-based social network manager process 112 includes a home screen feed process that allows users to receive notifications about activity within their private network of friends. Feeds are updated from the server 104 to the application and refreshed every time a user launches the application on the client device 102 or makes a network call within the application. Users are able to click on each individual feed and launch specific modules in the application to view or respond to the notification. For example, a user may receive a notification that three friends are nearby. Clicking that notification takes the user to the Friend map to view their friends. Likewise, a user may receive a notification that a friend has commented in his journal. Clicking that notification takes the user to the journal to view the comment. Once a user has clicked on a notification, it is removed and replaced by a new one. FIG. 15 illustrates an example of a notification page from the home screen feed process, under an embodiment. As shown in FIG. 15, the home page window including the user's picture, status message and location is displayed in display area 1502. The notification section 1504 lists new notifications provided by the home screen feed process. Clicking on a notification within the list launches a utility that allows the user to act on the notification. Several different notifications are possible. FIG. 16 is a table that lists several examples of notification types and the utilities that are launched when the user clicks on the notification. The server prioritizes the notifications based on a prioritization algorithm in order to display feeds that are most relevant and timely.

Group Conversations

Figure 17:
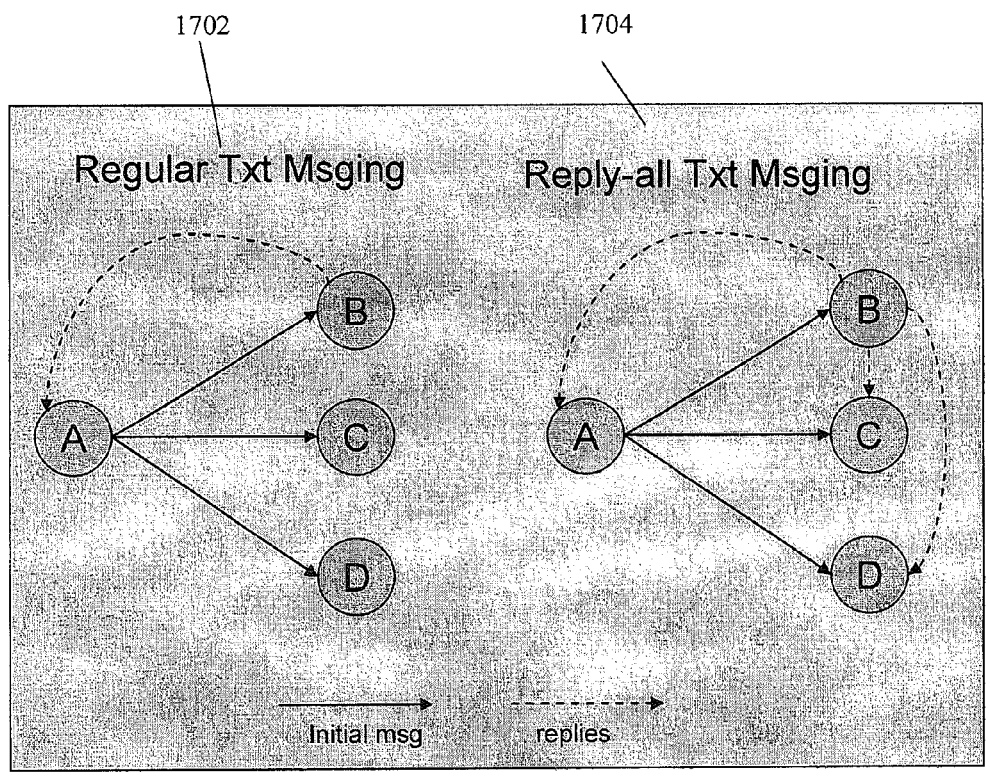
FIG. 17 illustrates the transmission of replies using the reply-all function, under an embodiment.

In one embodiment, the process 112 includes a group conversation component that allows a user to initiate a reply-all message with a group of friends via SMS or other text-based process. Using this function, referred to as "reply-all", replies to a group conversation are sent to all recipients of the original message. Within the context of the network service, group conversations are a useful way to facilitate communication between friends who are trying to meet up for a specific event, such as a night out or deciding where to eat dinner, etc. In general, with regular text messaging, replies to text messages sent from user A to two friends (B, C) are only returned to the sender (user A). With the reply-all messaging function the system, replies to user A's text message are delivered to the entire group (users A, B, and C). FIG. 17 illustrates the transmission of replies using the reply-all function, under an embodiment. As shown in FIG. 17, replies using regular text messaging 1702 are transmitted back from a recipient (B) to the sender only (A). Under the reply-all function 1704, replies are transmitted from the recipient (B) to all other members of the group (A, C, and D).

Users can choose to make a message a group conversation from within the mobile application or Website. A toggle box accessible through messaging components of the application allows the user to select the option to make a message a group conversation.

Recipients of a group conversation message can be friends who are outside of the service network managed through an external network manager. In other words, a user can send a group conversation to friends defined within the service, friends in their phone contact list, AIM buddies and the like. Group conversation messages include a list of abbreviated names of people included in the message (i.e., B Davies, J Doe, B Knapp, etc.).

At any point, recipients of group conversation messages can opt-out of receiving follow-on messages by simply responding with a simple command via SMS (i.e., quit). The system also provides commands to stop receiving group conversation messages completely (i.e., quit all) and to get help and more information (i.e., help). Commands are sent as replies to the message via the service's short code.

In one embodiment, a group management process allows users to label and save frequently used lists of friends for later use. Whenever a user chooses to send a group conversation to a list of friends, it is likely that they are implicitly identifying a well defined group of friends (i.e. college buddies, work friends, etc.). The group management process allows users to label and save these lists for later use.

Ping Function

In one embodiment, the location-based network manager process 112 includes a ping function that allows a user to quickly notify a friend who has been found on a friend map or in a friend list. The ping function transmits a short "ping" message to the friend that requests him or her to update their location for the user. The user who transmitted the ping message to a friend will receive a notification back once the friend updates their location. In one embodiment, the ping message and the notification back are sent via SMS messages.

Figure 18A:
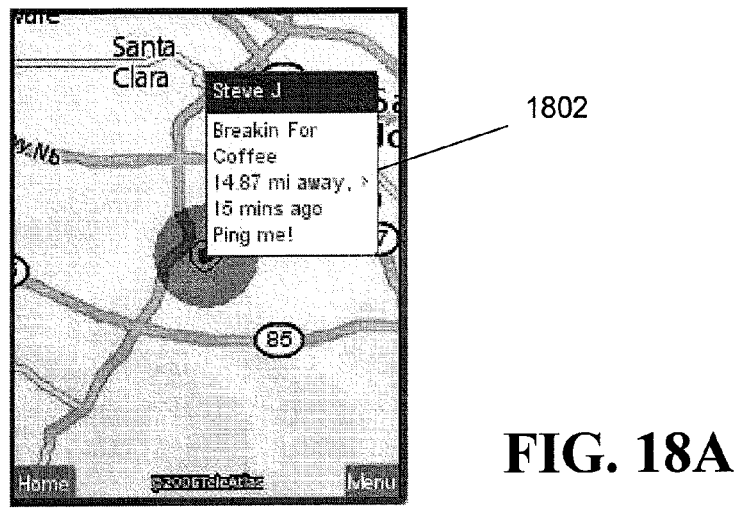
FIG. 18A illustrates the display of a friend on a user's client device, under an embodiment.
Figure 18B:
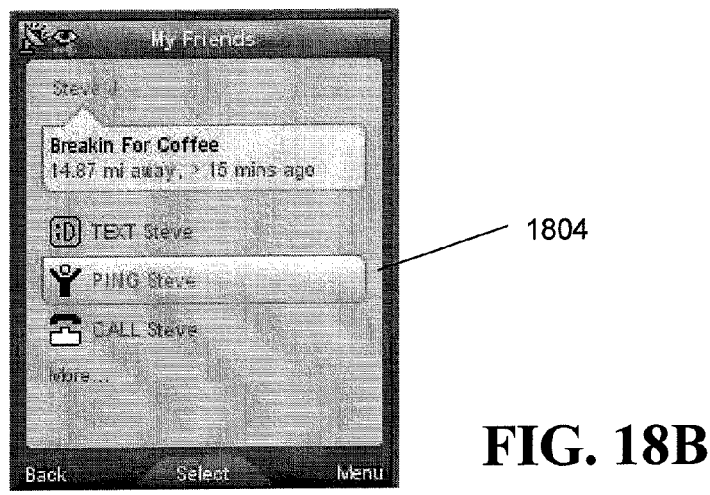
FIG. 18B illustrates a display screen that allows a user to select a means to contact a friend, under an embodiment.
Figure 18C:
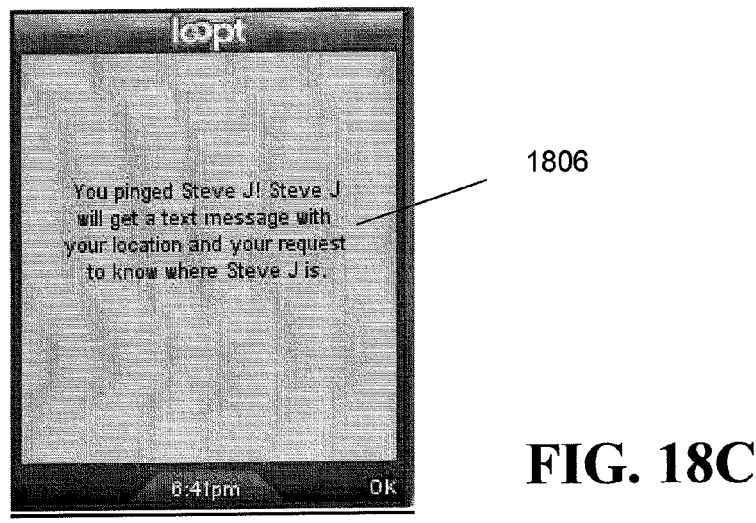
FIG. 18C illustrates a text message indicating the transmission of a ping message to the friend, under an embodiment.

FIG. 18A illustrates the display of a friend on a user's client device, under an embodiment. As shown in FIG. 18A, the location of a friend ("Steve J") is shown on a map displayed on the client device. The status message and distance from the user is displayed in display area 1802. Once the friend is located as shown in FIG. 18A, the user can contact this friend using several options, such as texting, chirping, calling, or pinging. FIG. 18B illustrates a display screen that allows a user to select a means to contact a friend, under an embodiment. If the user chooses to ping this friend by selecting icon 1804, an SMS message is sent to the friend requesting a location update that will be displayed on the map and/or friends list of the user's client device. The user receives a text message indicating the ping message to the friend, as shown in FIG. 18C. As shown in FIG. 18C, the message indicates that the friend has been requested to update their location, and that the current location of the user has been transmitted to that friend.

In one embodiment, the SMS messages transmitted by the ping function, as well as any of the other functions of the system are transmitted using a PPG push or SMS wake-up mechanism that launches the application straight from the SMS message itself. This function links the appropriate display screens to the SMS message so that they can be accessed directly from the SMS message.

The ping function can also be used with friends who are outside of the service network managed through an external network manager. In other words, a user can send a ping to anyone in their contact list, AIM buddies and the like. A ping to a non-network users is delivered via SMS and includes a request for their location, as well as a link to view their location on a web browser on the recipient's mobile device or client computer.

The location-based social network manager of an embodiment includes a mobile communication device comprising a network interface configured to allow the mobile communication device to communicate with one or more other mobile communication devices over a network. The device of an embodiment includes a geographic location circuit coupled to the network interface and configured to determine the location of the device relative to a terrestrial coordinate system. The device of an embodiment includes a graphical user interface including a display area allowing output of information to a user of the device. The device of an embodiment includes a map generation circuit configured to display a map encompassing an area around the location of the device on the graphical user interface. The map generation circuit of an embodiment displays geographic location information on the display area for any of the one or more other mobile communication devices that are within a predefined range of the device and that are in communication with the device over the network. The device of an embodiment includes a filter circuit configured to allow a user of the mobile communication device to limit sharing of geographic location information to certain users of the one or more other mobile communication devices by preventing display of the geographic location information on the displays of the mobile communication devices of users who are not selected as able to share the geographic location information.

The network of an embodiment comprises a cellular telephone network. The device and each of the one or more other mobile communication devices of an embodiment comprises a location aware cellular telephone.

The terrestrial coordinate system of an embodiment comprises a latitude/longitude coordinate system. The geographic location device of an embodiment comprises one of a global positioning system circuit, a WiFi circuit, and a mesh network circuit capable of determining a position of the device to within a predetermined radius of a given latitude/longitude position of the device.

Embodiments of the location-based social network manager process described herein may be applied to various types of computer and mobile device networks utilizing communication over the Internet or similar distributed network protocols.

Aspects of the mobile communication device location display system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the process include: microcontrollers with memory (such as EEPROM), embedded microprocessors, firmware, software, etc. Furthermore, aspects of the described process may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the location-sharing network manager process is not intended to be exhaustive or to limit the embodiments to the precise form or instructions disclosed. While specific embodiments of, and examples for, the process and system are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the location-based social network manager process in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the location-based social network manager process are presented below in certain claim forms, the inventor contemplates the various aspects of the methodology in any number of claim forms. For example, while only one aspect of the system is recited as embodied in machine-readable medium, other aspects may likewise be embodied in machine-readable medium. Accordingly, the inventor reserves the right to add additional claims after filing the application to pursue such additional claim forms for other aspects of the described systems and methods.

What is claimed is:

1. A location-aware mobile communication device system comprising:
   a registration device allowing a first user and second user to register for a location sharing service by validating possession of a respective location-aware-mobile device;
   a configuration device allowing the first user to invite the second user to establish a trusted relationship on a server computer coupled to each of the first and second user;
   a location sharing device displaying a location of the first user on the mobile device of the second user, when the trusted relationship has been established, and the first user has enabled location display of the first user's respective mobile device on the mobile device of the second user; and
   an external network manager device enabling the first user to transmit the location of the first user to a third user with whom a trusted relationship has not been established, wherein the third user is defined in a contact list resident on the first user's respective mobile device, and wherein the location is transmitted to the third user.

2. The system of claim 1 wherein the message includes a hyperlink to a web page showing the location of the first user on a mobile device operated by the third user.

3. The system of claim 2 wherein the location of the first user is displayed through a web browser process resident on the mobile device operated by the third user.

4. The system of claim 1 wherein the message is transmitted as an e-mail message.

5. The system of claim 1 wherein the message is transmitted as an SMS message.

6. The system of claim 1 wherein the message is transmitted as web message.

7. The system of claim 5 wherein the message is transmitted using PPG push methodology that links one or more utilities directly to the SMS message.

8. The system of claim 1 wherein the mobile device of the first user displays a home page through a graphical user interface. the home page displaying information related to activities, location updates, requests, and journal updates of the second user.

9. The system of claim 1 wherein the system:
   determines the location of the second user in terms of latitude and longitude;
   reverse geocodes the latitude and longitude data to determine a descriptive location of the second user; and displays the descriptive location of the second user on the display of the mobile device of the first user.

10. The system of claim 9 wherein the descriptive location comprises one of a street address, a city name, a neighborhood, or a place of interest name.

11. The system of claim 1 further comprising a ping process enabling the first user to transmit an SMS message to the second user, the SMS message requesting that the second user update their location on the mobile device of the first user.

12. The system of claim 1 wherein the location of the second user is provided to the first user with reference to a first scale, wherein the first scale is dependent upon the distance between the first user and the second user, and wherein the first scale is modified to a second scale when the distance changes by a pre-defined value.

13. The system of claim 1 further comprising a group messaging component enabling the first user to transmit a message to the second user and the third user, and wherein a reply transmitted by the second user is transmitted to the third user and the first user.

14. The system of claim 1 wherein the plurality of mobile devices are coupled to one another over a cellular telephone network, and wherein each respective location-aware mobile device comprises a cellular telephone.

15. The system of claim 12 wherein the location sharing component includes a location determining module selected from the group consisting of user input, global positioning system technology, WiFi positioning technology, Bluetooth technology, Radio Frequency signal technology, and Cellular identification technology.

* * * * *